(12) United States Patent
Naito et al.

(10) Patent No.: US 8,985,713 B2
(45) Date of Patent: Mar. 24, 2015

(54) VEHICLE BRAKE SYSTEM

(75) Inventors: Masayuki Naito, Aichi-gun (JP); Masahiro Matsuura, Chiryu (JP); Akitaka Nishio, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 381 days.

(21) Appl. No.: 13/246,174

(22) Filed: Sep. 27, 2011

(65) Prior Publication Data

US 2012/0074768 A1    Mar. 29, 2012

(30) Foreign Application Priority Data

Sep. 28, 2010  (JP) .................................. 2010-217417

(51) Int. Cl.
*B60T 13/58*    (2006.01)
*B60T 1/10*    (2006.01)
(Continued)

(52) U.S. Cl.
CPC ................. *B60T 13/586* (2013.01); *B60T 1/10* (2013.01); *B60T 8/4059* (2013.01); *B60T 8/4872* (2013.01); *B60T 13/686* (2013.01); *B60W 10/08* (2013.01); *B60W 10/188* (2013.01); *B60W 20/00* (2013.01); *B60W 30/18127* (2013.01); *B60L 3/0076* (2013.01); *B60L 7/14* (2013.01); *B60L 7/26* (2013.01); *B60L 11/14* (2013.01); *B60L 15/2009* (2013.01); *B60T 2270/604* (2013.01); *B60W 2540/12* (2013.01); *B60W 2710/083* (2013.01); *B60W 2710/182* (2013.01);
(Continued)

(58) Field of Classification Search
USPC .......................................... 303/151, 152, 191
See application file for complete search history.

(56) References Cited

U.S. PATENT DOCUMENTS

| 7,837,280 B2 * | 11/2010 | Okano et al. ................ 303/113.5 |
| 2010/0270854 A1 * | 10/2010 | Okano et al. ....................... 303/3 |
| 2011/0285198 A1 * | 11/2011 | Nakata et al. ..................... 303/3 |

FOREIGN PATENT DOCUMENTS

| JP | 2006-312384 A | 11/2006 |
| JP | 2007-308005 A | 11/2007 |

(Continued)

OTHER PUBLICATIONS

Japanese Office Action (Notice of Rejection Reasons) dated Sep. 4, 2012, issued in corresponding Japanese Patent Application No. 2010-217417, and English language translation of Office Action. (6 pages).

*Primary Examiner* — Bradley King
(74) *Attorney, Agent, or Firm* — Buchanan Ingersoll & Rooney PC

(57) ABSTRACT

Vehicle brake system comprises a hydraulic brake device, a regenerative brake device to drive wheels driven by a generator-motor and a brake control device for cooperatively controlling the hydraulic brake force and the regenerative brake force in response to an operation amount of a brake operation member. This vehicle brake system further includes a differential amount calculating portion calculating a differential amount by subtracting a regeneration execution brake force obtained by execution of the generator-motor from a regeneration request brake force, a regenerative range judging portion for judging whether the regeneration request brake force is within a range of a re-generable brake force which is executable by the generator-motor and a hydraulic pressure restricting portion for restricting increase of the hydraulic brake force when the differential amount is a positive value and the regeneration request brake force is within the range of the re-generable brake force.

9 Claims, 12 Drawing Sheets

(51) Int. Cl.

| | | |
|---|---|---|
| *B60T 8/40* | (2006.01) | |
| *B60T 8/48* | (2006.01) | |
| *B60T 13/68* | (2006.01) | |
| *B60W 10/08* | (2006.01) | |
| *B60W 10/188* | (2012.01) | |
| *B60W 20/00* | (2006.01) | |
| *B60W 30/18* | (2012.01) | |
| *B60L 3/00* | (2006.01) | |
| *B60L 7/14* | (2006.01) | |
| *B60L 7/26* | (2006.01) | |
| *B60L 11/14* | (2006.01) | |
| *B60L 15/20* | (2006.01) | |

(52) U.S. Cl.
CPC ...... *B60W 2720/406* (2013.01); *B60L 2210/40* (2013.01); *B60L 2240/12* (2013.01); *B60L 2240/423* (2013.01); *B60L 2240/461* (2013.01); *B60L 2250/26* (2013.01)
USPC .......................... 303/151; 303/152; 303/191

(56) References Cited

FOREIGN PATENT DOCUMENTS

| | | | |
|---|---|---|---|
| JP | 2011-101561 A | 5/2011 | |
| WO | WO 2009022211 A1 * | 2/2009 | ................ B60T 1/10 |

* cited by examiner

VEHICLE BRAKE SYSTEM

This application claims priority under 35 U.S.C. 119 with respect to Japanese Application No. 2010-217417 filed in Japan on Sep. 28, 2010, the entire content of which is herein incorporated by reference.

BACKGROUND OF THE INVENTION

1. Field of the Invention

The present invention relates to a vehicle brake system with a hydraulic brake device and a regenerative brake device and more particularly to a brake control system which is adapted to cooperatively control the hydraulic brake force generated by the hydraulic brake device and the regenerative brake force generated by the regenerative brake device.

2. Discussion of the Related Art

Recently, in a hybrid vehicle equipped with an engine and a generator-motor as plural driving sources for driving the hybrid vehicle, it became a common practice that the vehicle stores the electricity by converting the kinetic energy into the electric energy as a regenerative energy by means of the generator-motor upon braking operation thereby to improve fuel efficiency. In this meaning, the generator-motor is considered to be the regenerative brake device which applies regenerative brake force to the drive wheels of the vehicle. Since the regenerative brake device cannot generate sufficient brake force by alone, normally the hydraulic brake device, which is operated to generate brake force by means of hydraulic pressure, is used in combination therewith. Accordingly, it has become necessary to control the vehicle brake system by cooperatively using both the hydraulic brake force generated by the hydraulic brake device and the regenerative brake force generated by the regenerative brake device. For this reason, various cooperative control technologies have been proposed and one of such technologies is shown in a Japanese unexamined published patent application (publication No. 2006-312384, hereafter as Patent Document 1).

The Patent Document 1 discloses a vehicle regenerative brake and friction brake device which includes a regenerative brake means (regenerative brake device) and a regenerative brake torque control means, a friction brake means (hydraulic brake device) and a friction brake torque control means and a total brake torque determining means, wherein the regenerative brake torque and the friction brake torque can be cooperatively controlled upon braking operation. Further, the vehicle regenerative brake and the friction brake device includes an estimating means for estimating an estimated value of the regenerative brake torque, considering the delay of the actual value relative to a command value of the regenerative brake torque (regenerative brake force), wherein the friction brake torque control means controls the friction brake torque based on the total brake torque and the estimated value of the regenerative brake torque. According to this structure, the friction brake torque is highly accurately controlled so that the delay of actual value relative to the command value of the regenerative brake torque is compensated thereby to prevent uncomfortable brake operation feeling to an operator of the vehicle.

It should be noted here that in a brake system for a hybrid vehicle including the one in the Patent Document 1, it is general to structure the control portion of the hydraulic brake device and the control portion of the regenerative brake device (in other words, generator-motor) by different electronic control devices to each other and to functionally connect the two through a telecommunication means. For this reason, the technology disclosed in the Patent Document 1 achieved the effects that possible ill-affects derived from the delay of actual value relative to the command value of the regenerative brake force (torque) can be minimized, in other words, the ill-affect derived from the communication time delay until the command value reaches the generator-motor and the ill-affect resulted from responding time of the generator-motor can be minimized. However, since the communication transferring the command value of regenerative brake force (regeneration request brake value) and the actual value (regenerative execution brake value) is made with constant time intervals, the communication delay until the actual value returns becomes also a problem. For example, the control portion of the hydraulic brake device cannot immediately recognize the actual value due to the communication delay, even under the generator-motor being generating the regenerative brake force in response to an indicated value through the communication means. Accordingly, the control portion of the hydraulic brake device continues to indicate generation of the controlled hydraulic brake force until the control portion recognizes the actual value, presuming that the regenerative brake force has not yet been generated. Under this situation, since the regenerative brake force has been actually generated and the controlled hydraulic brake force has been continued to be applied, overlapping with the regenerative brake force, an excessive brake force was applied that may lead to deteriorate the brake feeling of the operator of the vehicle. In addition, the overlapping of the controlled hydraulic brake force reduces generation of the regenerative brake force that may lead to inefficient regeneration operation.

Further, the technology disclosed in the Patent Document 1 shows the method for obtaining an estimate value of the regenerative brake force. Since the regenerative brake device is subject to a vehicle operational condition, such as for example, vehicle running condition, the amount of re-generable brake force (brake force that can be regenerated) may vary, depending on the vehicle condition. Therefore, the operation of the regenerative brake device is not necessarily performed according to the estimated value. It is therefore, preferable to cooperatively control both hydraulic brake device and regenerative brake device, knowing the value of re-generable brake force in the regenerative brake device.

The invention is made considering the issues of the above related arts and it is an object of the invention to provide a vehicle brake system which can exhibit high regeneration efficiency as well as improve brake operation feeling of an operator of the vehicle by controlling brakes, knowing the re-generable brake force by the regenerative brake device.

SUMMARY OF THE INVENTION

Accordingly, it is a primary object of the present invention in one aspect to provide an improved vehicle brake system which comprises a hydraulic brake device for applying hydraulic brake force to wheels of a vehicle, a regenerative brake device for applying regenerative brake force to drive wheels among the wheels of the vehicle driven by a generator-motor and a brake control device for cooperatively controlling the hydraulic brake force of the hydraulic brake device and the regenerative brake force of the regenerative brake device in response to an operation amount of a brake operation member, characterized in that the brake control device includes a differential amount calculating means for calculating a differential amount by subtracting a regeneration execution brake force obtained by execution of the generator-motor from a regeneration request brake force obtained by command to the generator-motor, a regenerative range judging means for judging whether or not the regeneration request brake force is within a range of a re-generable brake force which is executable by the generator-motor and a hydraulic pressure restricting means for restricting increase of the hydraulic brake force when the differential amount is a positive value and the regeneration request brake force is within the range of the re-generable brake force.

It is another object of the present invention in a second aspect to provide an improved vehicle brake system which comprises a hydraulic brake device for applying hydraulic brake force to wheels of a vehicle, a regenerative brake device for applying regenerative brake force to drive wheels among the wheels of the vehicle driven by a generator-motor and a brake control device for cooperatively controlling the hydraulic brake force of the hydraulic brake device and the regenerative brake force of the regenerative brake device in response to an operation amount of a brake operation member, characterized in that the brake control device includes, upon decreasing a ratio of the regenerative brake force relative to a total target brake force determined by the operation amount of the brake operation member, a differential amount calculating means for calculating a differential amount by subtracting a regeneration execution brake force obtained by execution of the generator-motor from a regeneration request brake force obtained by command to the generator-motor, a regenerative range judging means for judging whether or not the regeneration request brake force is within a range of a re-generable brake force which is executable by the generator-motor and a hydraulic pressure increasing means for increasing the hydraulic brake force when the differential amount is a negative value and the regeneration request brake force is within the range of the re-generable brake force.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 11:
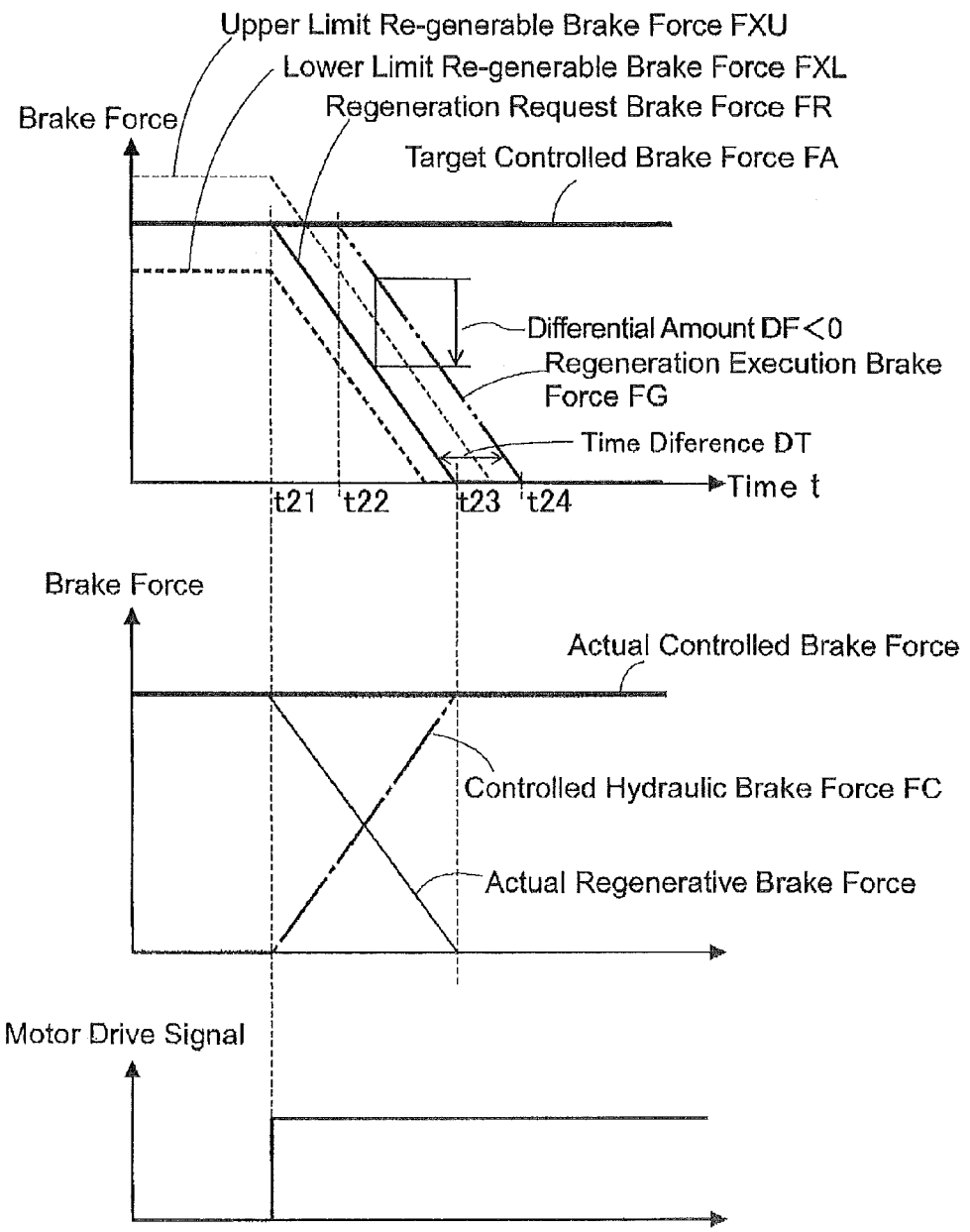
Figure 12:
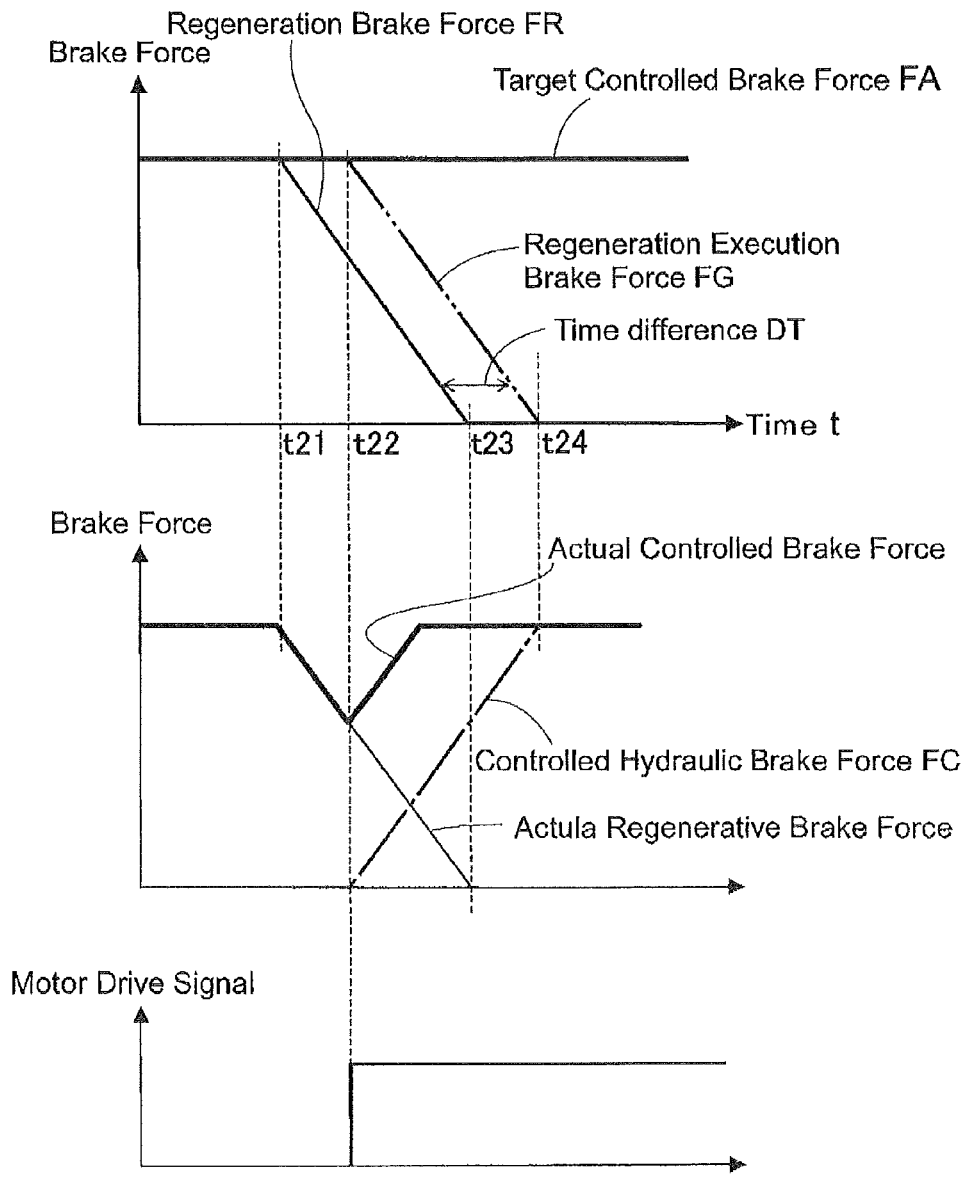

FIG. 11 is a graph schematically showing a result of execution of a brake ECU according to the second embodiment, wherein a brake control is executed which decreases the ratio of a regenerative brake force relative to the total target brake force when the depression amount of the brake pedal is constant; and FIG. 12 is similar to FIG. 11, but showing the result of execution using a conventional technology (related art).

DETAILED DESCRIPTION OF THE PREFERRED EMBODIMENTS

First Embodiment

Figure 1:
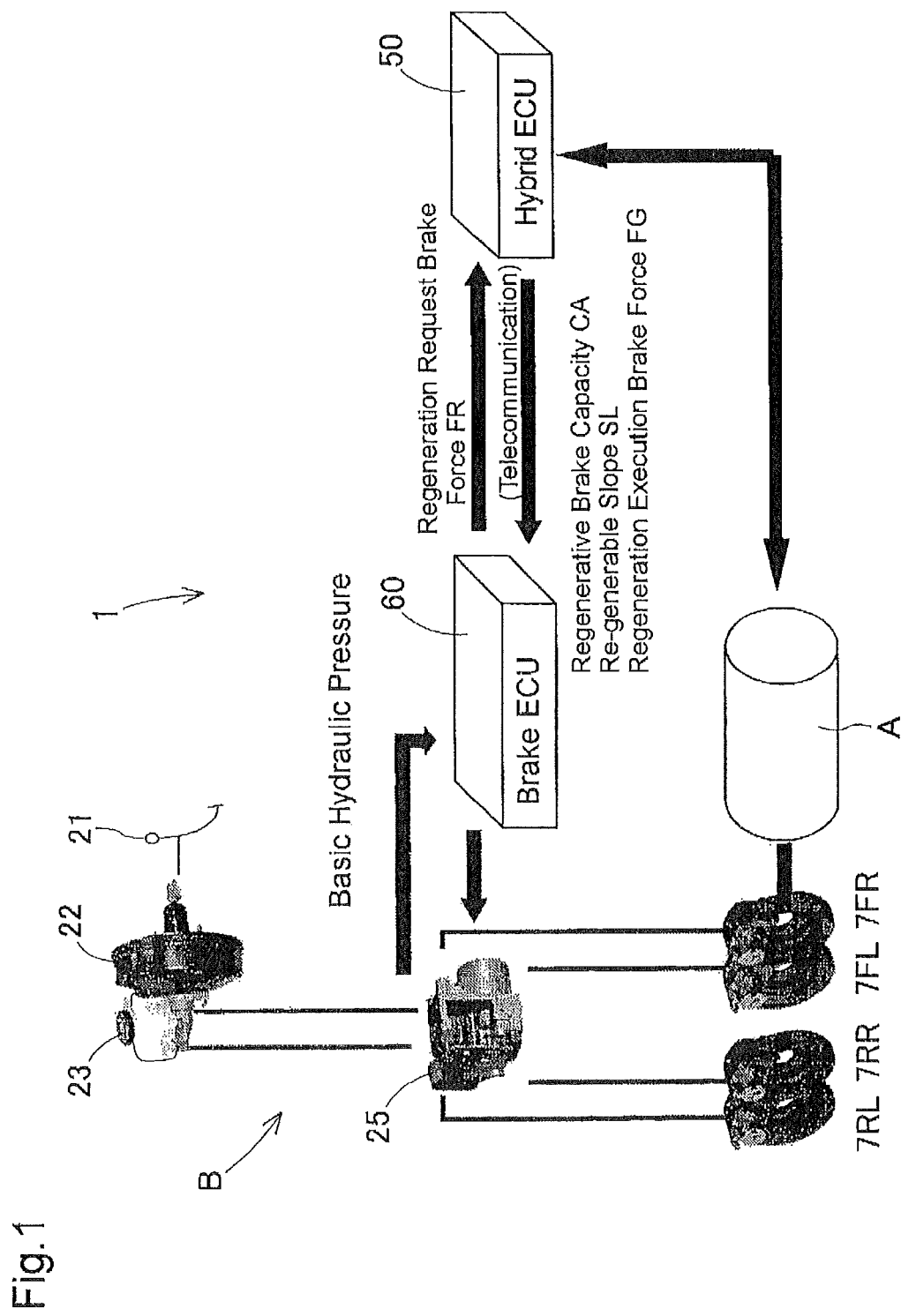
FIG. 1 shows an outline structure of a vehicle brake system according to a first embodiment of the invention.

A vehicle brake system of a first embodiment according to the present invention will be described hereinafter with reference to FIGS. 1 through 9 of the accompanying drawings. FIG. 1 shows an outline of the system structure of a vehicle brake system 1 according to the first embodiment. As shown in the FIG. 1, the vehicle brake system 1 is mainly comprised of a regenerative brake device A, a hydraulic brake device B, a hybrid ECU (Electronic Control Unit) 50 and a brake ECU 60. The vehicle brake system 1 of this embodiment is adapted to be installed in a front wheel drive, four (4) wheeled hybrid vehicle and is normally operated in response to the operation (or depression) of a brake pedal 21 by an operator of the vehicle and the system 1 includes another function in which the brake ECU automatically sets a brake force in response to a vehicle running condition to adjust the total brake force, independently of the former function.

The regenerative brake device A is formed by a generator-motor (not shown) and includes an inverter device and a battery device (both are not shown). The generator-motor is driven by the inverter device which converts the DC voltage of the battery device to the AC voltage. The generator-motor serves as a motor to drive a front right wheel 7FR and a front left wheel 7FL which are the drive wheels of the vehicle. Further, the generator-motor also serves as a generator driven by the front right and front left wheels 7FR and 7FL to charge the battery device via the inverter device. Under such situation, the regenerative brake force is applied to the front right wheel 7FR and the front left wheel 7FL by a reaction force from the generator-motor and this brake force is generally called as a regenerative brake force (regenerative brake device A). Since the front right wheel 7FR and the front left wheel 7FL are connected to the generator-motor through a common vehicle axle, approximately the equal amount of regenerative brake force is generated at each wheel 7FR and 7FL. It is noted that instead of providing a generator-motor, a generator and a motor may be provided separately and the regenerative brake function (regenerative brake device A) is provided at the generator to generate the regenerative brake force.

The hybrid ECU 50 is an electronic control device for controlling the entire power train of the hybrid vehicle and cooperatively controls both engine (not shown) and the generator-motor. The hybrid ECU 50 serves as a function of regenerative brake control portion and is connected to the inverter device to control the regenerative brake device A.

Figure 2:
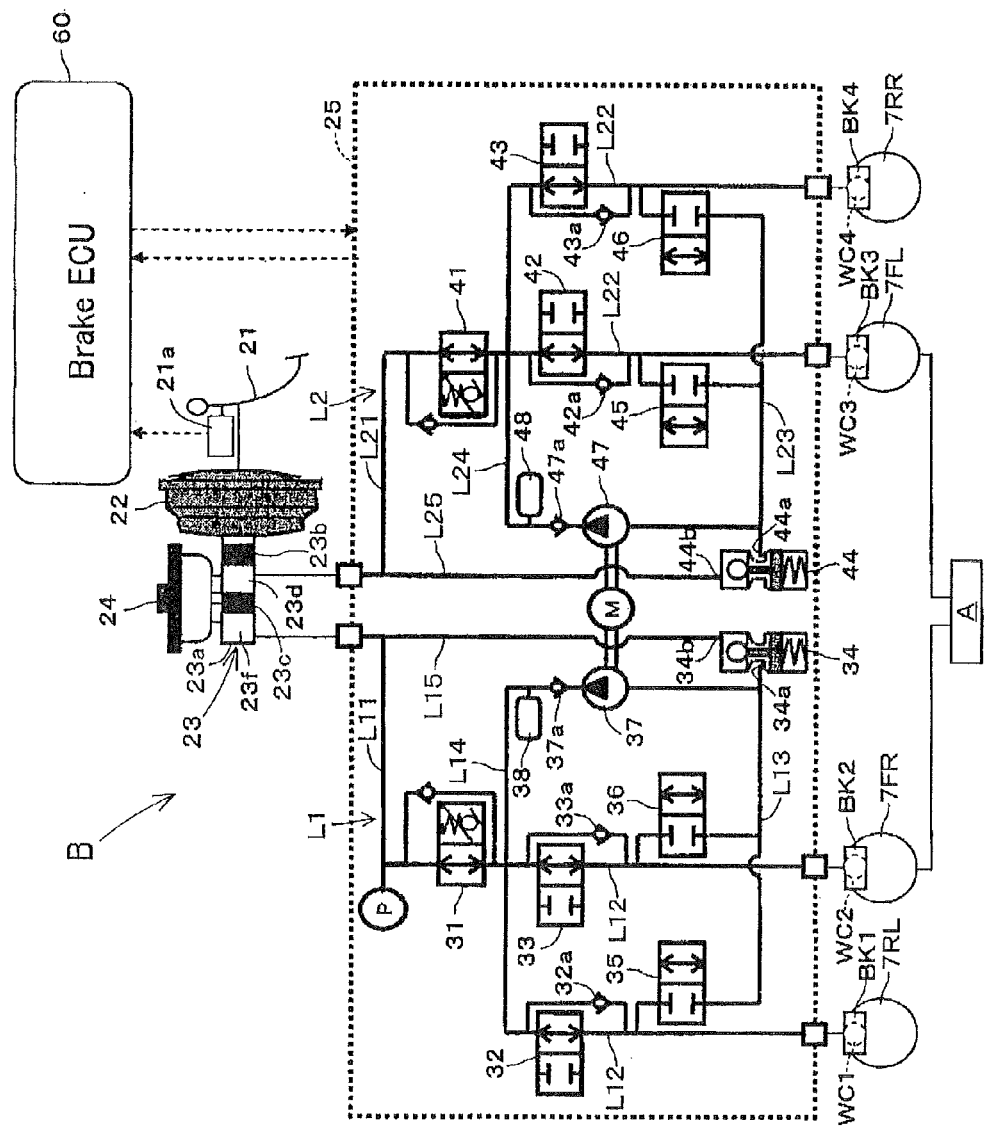
FIG. 2 is a schematic diagram of the hydraulic brake device illustrated in FIG. 1.

The hydraulic brake device B uses the brake liquid as the operation fluid and as shown in FIG. 2, the hydraulic brake device B is mainly comprised of a brake pedal 21, a vacuum type brake booster 22, master cylinder 23 and a hydraulic control unit 25. The hydraulic brake device B generates the basic hydraulic pressure by assisting the depression operation of the brake pedal 21 by boosting operation of the vacuum type brake booster 22 to thereby actuate the master cylinder 23. Then the hydraulic control unit 25 supplies controlled hydraulic pressure through pumps in addition to the basic hydraulic pressure to each wheel cylinder WC2, WC3, WC4 and WC1, respectively provided at corresponding each wheel, front right wheel 7FR, front left wheel 7FL, rear right wheel 7RR and rear left wheel 7RL. Detailed explanation of the hydraulic brake device B will be made hereinafter with reference to FIG. 2.

FIG. 2 shows the detail structure of the hydraulic brake device B, also shown in FIG. 1. The brake pedal 21 is a member corresponding to the brake operating member which operates the vacuum type brake booster 22 in response to the depression amount of the pedal by the operator of the vehicle. The stroke amount which corresponds to the operation amount of the brake pedal 21 is detected by a pedal stroke sensor 21a and a detecting signal is outputted therefrom to the brake ECU 60. The vacuum type brake booster 22 utilizes the vacuum supplied from the engine and assists the depression operation of the brake pedal 21 to actuate the master cylinder 23.

The master cylinder 23 is of a tandem type and comprised of a housing 23a formed with a closed bottom cylindrical shape and a first piston 23b and a second piston 23c fluid tightly arranged within the housing 23a and slidable therein. A first hydraulic chamber 23d is provided in the housing 23a between the first and the second pistons 23b and 23c and a second hydraulic chamber 23f is provided between the second piston 23c and the closed bottom of the housing 23a. The first and the second pistons 23b and 23c are slidably movable by the operation of the hydraulic type brake booster 22 to generate the basic hydraulic pressure in the first and the second hydraulic chambers 23d and 23f. A reservoir 24 is in fluid communication with the first and the second hydraulic chambers 23d and 23f under the pistons 23b and 23c being in non-operating condition to adjust the amount of the operation fluid (brake liquid).

The hydraulic control unit 25 is comprised mainly of hydraulic pressure control valves 31 and 41, pressure increase control valves 32, 33, 42 and 43 and pressure decrease control valves 35, 36, 45 and 46 forming an ABS (Anti-lock Brake System) control valve, pressure modulation reservoirs 34 and 44, pumps 37 and 47 and a motor M. These components are integrated in one single case. As shown in FIG. 2, a brake supply conduit system of the hydraulic brake device B according to the first embodiment includes a first line L1 for supplying hydraulic brake force to the front right wheel 7FR and the rear left wheel 7RL and a second line L2 for supplying hydraulic brake force to the front left wheel 7FL and the rear right wheel 7RR. This brake supply conduit system forms an X-piping or diagonal piping system. The first chamber 23d of the master cylinder 23 is connected to the second line L2, while the second chamber 23f is connected to the first line L1.

First, the first line L1 of the hydraulic control unit 25 will be explained. In the first line L1, the pressure control valve 31 formed by a pressure differential valve is provided for switching between the communication condition and the pressure differential condition by the control of the brake ECU 60. The pressure control valve 31 is of normally open type valve. The hydraulic pressure in a conduit line L12 at the wheel cylinder WC1 and WC2 side is kept higher than the basic pressure level in a conduit line L11 at the master cylinder 23 side by a predetermined value when the valve 31 is switched over from the communication condition (open condition) to the pressure differential condition (closed condition). This differential pressure is the controlled pressure which can be obtained by the discharge pressure from the pumps 37 and 47, the structure of the pumps being explained later in detail.

The conduit line L12 is branched in two lines and the pressure increase control valve 32 is provided in one of the branch lines. The pressure increase control valve 32 controls pressure increase of the brake pressure to the wheel cylinder WC1 in the rear left wheel 7RL. The pressure increase control valve 33 is provided in the other branch line to control pressure increase of the brake pressure to the wheel cylinder WC2 in the front right wheel 7FR. These pressure increase control valves 32 and 33 are formed to be the two position valve which can be switched over between two positions, fluid communication condition position and fluid interruption condition position by the control of the brake ECU 60. When the two pressure increase control valves 32 and 33 are controlled to be in fluid communication condition, either the basic hydraulic pressure from the master cylinder 23 or the controlled hydraulic pressure generated by the pump 37 in addition to the basic hydraulic pressure is supplied to each of the wheel cylinders WC1 and WC2.

Further, the conduit line L12 between the pressure increase control valves 32 and 33 and the wheel cylinders WC1 and WC2 is in communication with the reservoir bore 34a of the pressure modulation reservoir 34 through a conduit line L13. In this conduit line L13, pressure decrease control valves 35 and 36 are provided. The pressure decrease control valves 35 and 36 are controlled to be switched over between the fluid communication condition and the fluid interruption condition by the control of the brake ECU 60.

Under a normal braking operation where no ABS function is performed, the pressure increase control valves 32 and 33 are in fluid communication condition whereas the pressure decrease control valves 35 and 36 are in fluid interruption condition. When the ABS control is performed under the pressure decreasing mode, the pressure increase control valves 32 and 33 are closed and the pressure decrease control valves 35 and 36 are open. Under such condition, the operation fluid is discharged to the modulation reservoir 34 through the conduit line L13 to decrease the hydraulic pressure in the wheel cylinders WC1 and WC2 and possible locking of the front right wheel 7FR and rear left wheel 7RL can be prevented.

Under the pressure increasing mode during the ABS function being performed, the pressure increase control valves 32 and 33 are open and the pressure decrease control valves 35 and 36 are closed. Under such condition, the hydraulic pressure at the wheel cylinders WC1 and WC2 increases to increase the brake force applied to the front right wheel 7FR and the rear left wheel 7RL. It is noted that each of the pressure increase control valves 32 and 33 is provided with a safety valve 32a and 33a in parallel, respectively. These safety valves 32a and 33a are used for returning the operation fluid from the wheel cylinders WC1 and WC2 to the reservoir 24 when no brake pedal depression is detected during the ABS function operation.

Further, a conduit line L14 is provided to connect the reservoir bore 34a of the pressure modulation reservoir 34 with the conduit line L12 at a point between the pressure control valve 31 and the pressure increase control valves 32 and 33. The pump 37 is provided in the conduit line 14 together with a safety valve 37a. A damper 38 is provided at the discharge side of the pump 37 to absorb pressure pulsation of the operation fluid discharged from the pump 37 passing the fluid to the conduit line L12. The suction side of the pump 37 is connected to the reservoir bore 34a of the pressure modulation reservoir 34. Another conduit line L15 is provided which connects a reservoir bore 34b of the pressure modulation reservoir 34 with the conduit line L11 to establish communication between the pressure modulation reservoir 34 and the master cylinder 23.

The discharge amount of the pump 37 is adjusted by controlling a driving current of the motor M by a command from the brake ECU 60. The pump 37 is operated during the pressure decreasing mode of the ABS operation to suction the operation fluid in the wheel cylinders WC1 and WC2 or the operation fluid reserved in the pressure modulation reservoir 34 and returns the fluid to the master cylinder 23 through the pressure control valve 31 under the fluid communication condition. It is noted that this pump 37 is also used to generate controlled hydraulic pressure in an active cruising control (constant speed driving control) function, braking assist function, and a vehicle posture stability control function such as, for example, an electric stability control function, or traction control function.

In other words, the pump 37 suctions the operation fluid in the master cylinder 23 through the conduit lines L11 and L15 and supplies the operation fluid to the hydraulic pressure control valve 31 under the differential pressure condition to generate a pressure differential thereby. The controlled hydraulic pressure generated by the hydraulic pressure control valve 31 is supplied to each of the wheel cylinders WC1 and WC2 through the conduit lines L14 and L12 and the pressure increase control valves 32 and 33. the hydraulic pressure control valve 31 under the differential pressure condition. Further, the pump 37 is operated to generate and supply the controlled hydraulic pressure to each wheel cylinder WC1 and WC2 when the regenerative brake device A cannot generate sufficient regenerative brake force.

Further, a pressure sensor P is provided in the conduit line L11 for detecting the level of the basic hydraulic pressure generated in the master cylinder 23 and the detection signal from this sensor is sent to the brake ECU 60. The positions of the first and the second pistons 23b and 23c in the master cylinder 23 can be confirmed from the level of the basic hydraulic pressure which is detected by the pressure sensor P. From the positions of the first and the second pistons 23b and 23c in the master cylinder 23, the depression amount of the brake pedal 21 can be detected. This pressure sensor P may be provided in the conduit line L21 of the second line L2.

Further, the second line L2 of the hydraulic control unit 25 has similar structure to the first line L1 and is formed by the conduit lines L21 through L25. The control valves are arranged also similar to those in the first line L1. A hydraulic pressure control valve 41 and a pressure modulation reservoir 44 are provided in the second line L2. The second line L2 is branched into two conduit lines L22 and one of the branched conduit lines is provided with a pressure increase control valve 42 which controls increase of hydraulic brake pressure to the wheel cylinder WC3 of the front left wheel 7FL and the other branched conduit line L22 is provided with the other pressure increase control valve 43 which controls increase of hydraulic brake pressure to the wheel cylinder WC4 of the rear right wheel 7RR. Further, two pressure decrease control valves 45 and 46 are provided in the conduit line L23 and a pump 47 is provided in the conduit line L24.

The basic hydraulic pressure generated in the master cylinder 23 and the controlled hydraulic pressure generated by operation of the pumps 37 and 47 and by the control of hydraulic pressure control valves 31 and 41 are supplied to the wheel cylinders WC1, WC2, WC3 and WC4 of each wheel 7RL, 7FR, 7FL and 7RR by actuation of the hydraulic control unit 25. When the basic hydraulic pressure and the controlled hydraulic pressure are supplied to each wheel cylinder WC1, WC2, WC3 and WC4 as the hydraulic brake pressure, each wheel cylinder operates the brake means BK1 through BK4, each provided at each corresponding wheel cylinder to apply basic hydraulic brake force FB and the controlled hydraulic brake force FC to each wheels 7RL, 7FR, 7FL and 7RR. The brake means BK1 through BK4 are formed by, for example, a disc brake or a drum brake. The brake means BK1 through BK4 restrict the rotation of a disc rotor or a brake drum which is integrally fixed to the wheels of the vehicle for unitary rotation therewith by pressurizing a friction material, such as brake pad or brake shoe to be in contact with the disc rotor or the brake drum.

The brake ECU 60 is an electronic control device which corresponds to the hydraulic brake control portion and in cooperation with the hybrid ECU 50, the brake ECU 60 controls the overall vehicle brake system 1. The brake ECU 60 controls opening or closing of the valves in the hydraulic control unit 25 and controls the motor M to drive the pumps 37 and 47. Further, the brake ECU 60 receives detection signals from the pedal stroke sensor 21a and the pressure sensor P. The brake ECU 60 also calculates total target brake force FT in response to the operation amount (depression amount) of the brake pedal 21 and subtracts the basic hydraulic brake force FB from the total target brake force FT to obtain a target controlled brake force FA. This target controlled brake force FA is distributed to the controlled hydraulic brake force FC and the regenerative brake force. The brake ECU 60 and the hybrid ECU 50 are connected to each other by a communication means and correspond to the brake control device which cooperatively controls both controlled hydraulic brake force FC and the regenerative brake force.

Figure 3:
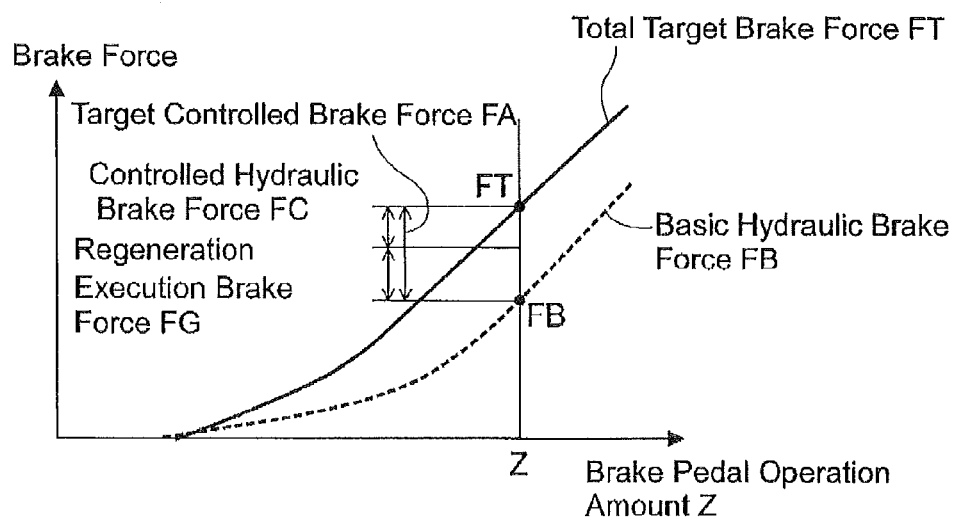
FIG. 3 is a graph showing an operational performance of the vehicle brake system according to the first embodiment of the invention.

FIG. 3 is a graph explaining the operational performance of the vehicle brake system 1 according to the first embodiment of the invention. The horizontal axis indicates the operation amount of brake pedal 21 and the vertical axis indicates the brake force. In the drawing, solid curve line represents the total target brake force FT which is defined by the operation amount of brake pedal 21 and the broken curve line represents the basic hydraulic pressure brake force FB corresponding to the basic hydraulic pressure generated in the master cylinder in response to the operation amount of the brake pedal 21. The target controlled brake force FA is obtained by subtracting the basic hydraulic brake force FB from the total target brake force FT (FA=FT−FB). The target controlled brake force FA is distributed to the regenerative brake force (regeneration execution brake force FG) of the regenerative brake device A and the controlled hydraulic brake force FC generated by the pump driving. Accordingly, the total target brake force FT can be generated. The sum of actually generated regenerative brake force and the controlled hydraulic brake force FC corresponds to the actual controlled brake force. It is noted the operational performance illustrated in FIG. 3 is memorized in advance in the brake ECU 60 as a map in the form of list or matrix or a relational expression and used as needed.

The control execution flow for the brake ECU 60 according to the first embodiment of the invention will be explained with reference to FIG. 4. As shown in the drawing, the brake ECU 60 executes input processing at step S1. In detail, in this input processing, the detecting signals from the pedal stroke sensor 21a and the pressure sensor P are inputted and information exchange with the hybrid ECU 50 is carried out. At step S2, the pedal operation amount Z of the brake pedal 21 is calculated based on the detection signals from the pedal stroke sensor 21a and the pressure sensor P. In order to improve the accuracy of detection for pedal operation amount, this embodiment uses both pedal stroke sensor 21a and pressure sensor P. However, either one of the sensors may be used to calculate the pedal operation amount Z. At step S3, the total target brake force FT corresponding to the pedal operation amount Z of the brake pedal 21 and the basic hydraulic pressure brake force FB are obtained from the operational performance illustrated in FIG. 3. At step S4, the target controlled brake force FA is calculated by subtracting the basic hydraulic brake force FB from the total target brake force FT obtained at Step S3.

At the next step S5, the brake ECU 60 sends the command of the regeneration request brake force FR equal to the target controlled brake force FA to the generator-motor via the hybrid ECU 50. At step S6, the brake ECU 60 receives regenerative brake capacity CA, re-generable slope SL and regeneration execution brake force FG from the hybrid ECU 50.

The regenerative brake capacity CA is determined by the total re-generable amount of brake force which is the generator-motor is able to generate at a certain time. In addition to the operational performance of the generator-motor, the wheel rotational speed of the drive wheels, such as front right wheel 7FR and front left wheel 7FR and the chargeable amount of the battery device are considered when deciding the capacity. The regenerative brake force actually generated by the generator-motor does not exceed the regenerative brake capacity CA. The re-generable slope SL is a time rate of change, at which the re-generable brake force of the generator-motor can be changeable at a certain time period and is an index indicating how far the regenerated brake force at a certain time can be changed at a next time period. The upper limit increase of the re-generable slope is indicated as SLU, while the lower limit decrease of the re-generable slope is indicated as SLL. These upper and lower limits of increase and decrease of re-generable slopes SLU and SLL are determined by the operational performance of the generator-motor, drive wheel rotational speed and the magnitude of actually presently generated regenerative brake force.

The regenerative brake capacity CA and the re-generable slope SL (SLU, SLL) are memorized in advance in the hybrid ECU 50 in the form of list, map or relational expression. The hybrid ECU 50 has functions of specifying the regenerative brake capacity CA and the re-generable slope SL, which correspond to regenerative brake capacity specifying means and re-generable slope specifying means, respectively. It is noted here that the regeneration execution brake force FG indicates the amount of regenerative brake force which the generator-motor actually generated.

At the next step S7, the re-generable brake force FX is calculated. This calculation corresponds to obtaining a range of the upper and lower limits of the re-generable brake force that the actual regenerative brake force at this point of time can be changeable until a next certain point of time. The upper limit re-generable brake force FXU is obtained by adding the upper re-generable slope SLU to the regeneration request brake force FR. The maximum value of the upper limit re-generable brake force FXU is the value of regenerative brake capacity CA, since the upper limit re-generable brake force. FXU theoretically never exceeds the regenerative brake capacity CA, even the calculation result should indicate such exceeded value. On the other hand, the lower limit re-generable brake force FXL is obtained by adding the lower re-generable slope SLL (negative value) to the regeneration request brake force FR.

It is impossible for the brake ECU 60 to know actual regenerative brake force and accordingly, based on the most probable regeneration request brake force FR as a standard, the upper and lower re-generable brake force FX are determined. In other words, this concept is that as long as the generator-motor (regenerative brake device A) is operated in good condition, a sufficient regenerative brake force is generated which satisfies regeneration request brake force FR. According to another method for obtaining, the upper and lower limits may be set based on the regeneration execution brake force FG in spite of the time difference caused by the communication delay. Further, based on the regeneration request brake force FR or the regeneration execution brake force, regenerative brake capacity CA and re-generable slope SL (SLU, SLL) at the present time, not only the next time, but also next after next time or more later, the limits of the re-generable brake force (re-generable brake force FX) may be presumed. The execution of step S7 corresponds to the re-generable range estimating means. In the next step S8, the controlled hydraulic brake force FC is obtained by the following equation:

controlled hydraulic brake force $FC$=target controlled brake force $FA$-$MED$ (regeneration request brake force $FR$, upper limit re-generable brake force $FXU$, lower limit re-generable brake force $FXL$)

In the above equation, logical operation symbol MED means to select an intermediate value among the three parameters and the intermediate value will be the expected value of actually generated regenerative brake force. In other words, if the regeneration request brake force FR is positioned between the upper limit re-generable brake force FXU and lower limit re-generable brake force FXL, the regenerative brake force as requested by the regeneration request brake force FR can be expected. If the regeneration request brake force FR exceeds the upper limit re-generable brake force FXU, the generation of the upper limit re-generable brake force FXU is expected. If the regeneration request brake force FR is bellow the lower limit re-generable brake force FXL, the generation of the lower limit re-generable brake force FXL is expected. Accordingly, the controlled hydraulic brake force FC can be obtained by subtracting the intermediate value from the target controlled brake force FA.

At step S9, differential amount DF is calculated by subtracting the regeneration execution brake force FG from the regeneration request brake force FR. At step S10, the calculated differential amount DF is checked whether the value is positive or negative and if the value is judged as positive, then the execution proceeds to step S11. At step S11, it is judged whether the regeneration request brake force FR is within the range of re-generable brake force FX, that is to say whether the regeneration request brake force FR is between the upper limit re-generable brake force FXU and lower limit re-generable brake force FXL. If "Yes", the execution goes to step S12. At step S12, the brake ECU 60 stops the actuation of the pumps 37 and 47 in the hydraulic control unit 25 to restrict the controlled hydraulic brake force FC regardless of the obtained value of the controlled hydraulic brake force FC at the step S8. The execution at step S9 corresponds to the differential amount calculating means and the execution at step 11 corresponds to the regenerative range judging means. The execution at step S12 corresponds to the hydraulic pressure restricting means and pump restricting means.

When the conditions at step S10 or S11 is not satisfied ("No"), the process goes to step S13. If the calculated value of the controlled hydraulic brake force FC is positive, the process goes to step S14 and if not ("Negative"), then goes to step S12. At step S14, the pumps 37 and 47 in the hydraulic control unit 25 are driven to generate the controlled hydraulic brake force FC. The steps S12 and S14 merge at the step S15 to control the hydraulic control valve 31 and 41 in the hydraulic control unit 25 at the step S15. Thus the restriction and generation of the controlled hydraulic brake force FC are achieved and the control flows is completed and return to step S1 for repletion of the control.

The operation of the vehicle brake system 1 according to the first embodiment 1 will be explained hereinafter in detail. FIG. 5 schematically indicates the result of execution of brake ECU 60 according to the control flow in FIG. 4 when the operation amount of the brake pedal 21 increases. The vertical axis indicates brake force and the horizontal axis indicates the time "t". As shown in the drawing, the operation amount of the brake pedal 21 is approximately kept constant from time "t1" to "t3" and the operation amount increases from the time "t3" to "t6". The amount again becomes constant from the time "t6". The target controlled brake force FA, i.e., the regeneration request brake force FR also changes similarly according to the increase of the operation amount of the brake pedal 21. The value FR1 at time "t1" through the value FR3 at "t3" are constant, but from time "t3" to "t6", the value FR increases. The value FR6 at time "t6" and thereafter also becomes approximately constant. The value varies in three polygonal lines.

The calculation of re-generable brake force FX (FXU, FXL) is explained with reference to the graph in FIG. 5. Assuming that at time "ti" the regeneration request brake force FRi is requested and the regenerative brake capacity CAi, the upper re-generable slope SLUi and lower re-generable slope SLLi (negative value) are received, the upper and the lower re-generable brake forces FXUj and FXLj at the time "tj" will be obtained from the following equations:

Upper re-generable brake force $FXUj$ = regeneration request brake force $FRi$ + upper re-generable slope $SLUi$ Lower re-generable brake force $FXLj$ = regeneration request brake force $FRi$ + lower re-generable slope $SLLi$ The upper limit value of the upper limit re-generable brake force FXUj has a ceiling of the value of regenerative brake capacity CAi, regardless of the calculation result from the above equation. Thus obtained upper and lower limit re-generable brake forces FXU and FXL are indicated with broken lines and received regenerative brake capacity CA is indicated with a thin solid line.

The regenerative brake capacity CA at time "t1" is the value CA1 which is greater than the value FR1 of the regeneration request brake force FR and gradually increases from around a middle point of time between "t1" and "t3". At the time "t5", the value of the regenerative brake capacity CA agrees to the value FR5 of the regeneration request brake force FR and then at the time "t6", becomes the value CA6 smaller than the value FR6 of regeneration request brake force FR. At the time "t7", the value of the regenerative brake capacity CA again agrees to the value FR7 of the regeneration request brake force FR. Thereafter, both values of the regenerative brake capacity CA and regeneration request brake force FR become constant and agree to each other. The upper limit re-generable brake force FXU is the value FXU1 at the time "t1" which is between the values of the regeneration request brake force FR1 and the regenerative brake capacity CA1 and is approximately constant until the time "t3". The upper limit re-generable brake force FXU increases from the time "t3" and at the time "t4" the value thereof agrees to the value CA4 of the regenerative brake capacity CA. The value of the upper limit re-generable brake force FXU at the time "t4" becomes the ceiling value and from the time "t4" the value thereof agrees to the regenerative brake capacity CA. The value FXL1 of the lower re-generable brake force FXL at the time "t1" is smaller than the value FR1 of the regeneration request brake force FR and thereafter, the value of the lower re-generable brake force FXL shifts always under the value of the regeneration request brake force FR.

After the generator-motor (regenerative brake device A) receives the request of the regeneration request brake force FR, the generator-motor generates the regenerative, brake force equal to the requested value of the regeneration request brake force FR from the time "t1" through "t5". This is because the regeneration request brake force FR is positioned between the values of the upper re-generable brake force FXU and the lower re-generable brake force FXL during the time period. However, between the time "t5" and the time "t7", the generator-motor can generate the regenerative brake force only along the line (from FR5 via CA6 to FR7) of the upper re-generable brake force FXU equal to the regenerative brake capacity CA. Accordingly, the shaded area in FIG. 5 indicates the insufficient generation of the regenerative brake force. After the time "t7" the generator-motor generates the regenerative brake force equal to the regeneration request brake force FR.

Figure 4:
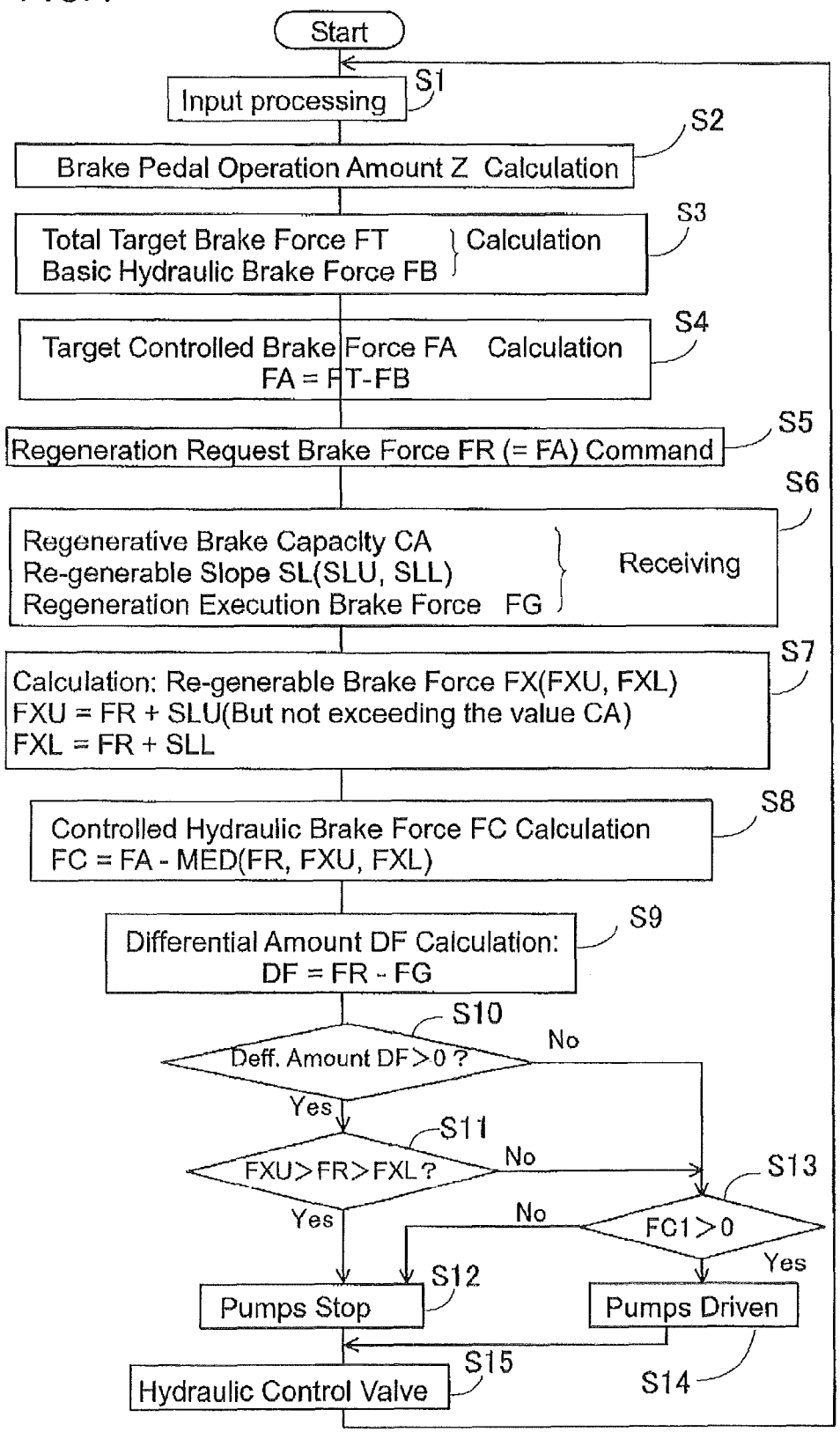
FIG. 4 is a control flowchart for brake ECU according to the first embodiment of the invention.
Figure 5:
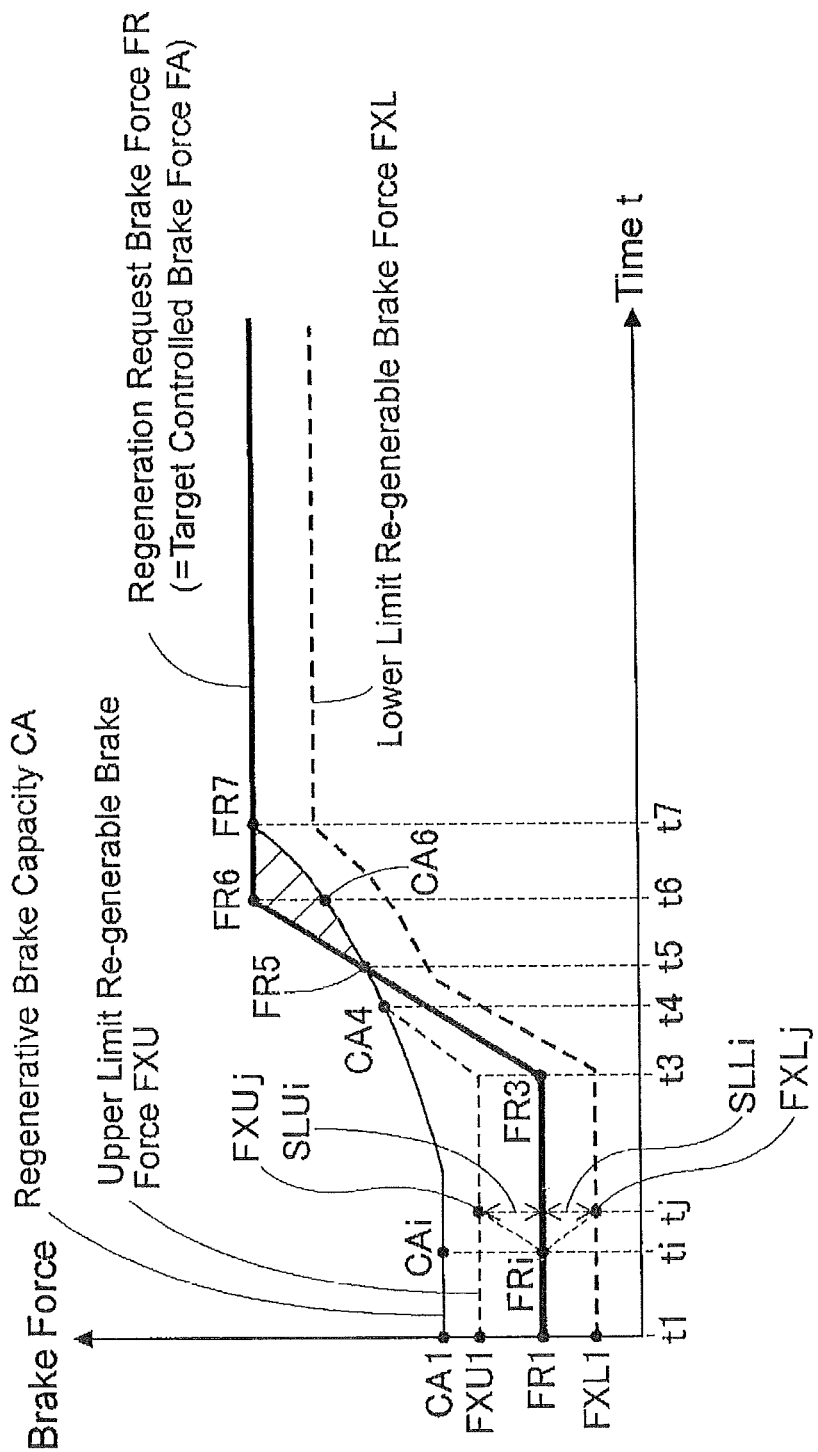
FIG. 5 is a graph schematically showing a result of execution of the brake ECU according to the control flowchart in FIG. 4 when a brake pedal depression amount is increased.

On the other hand, the brake ECU calculates the insufficient regenerative brake force shown by the shaded area from the time "t5" to "t7" as the controlled hydraulic brake force FC1 at the step S8 of the flowchart in FIG. 4. Further, since the condition in step S11 is not satisfied ("No"), the process goes to the steps S13 and S14 to drive the pumps 31 and 41. Thus the controlled hydraulic brake force FC corresponding to the insufficient regenerative brake force can be generated to satisfy the total target brake force FT.

Thus according to the present embodiment, the total target brake force FT can be obtained by cooperatively controlling the controlled hydraulic brake force FC of the hydraulic brake device B and the regenerative brake force of the regenerative brake device A, without referring to the regeneration execution brake force FG which has a communication delay.

Figure 6:
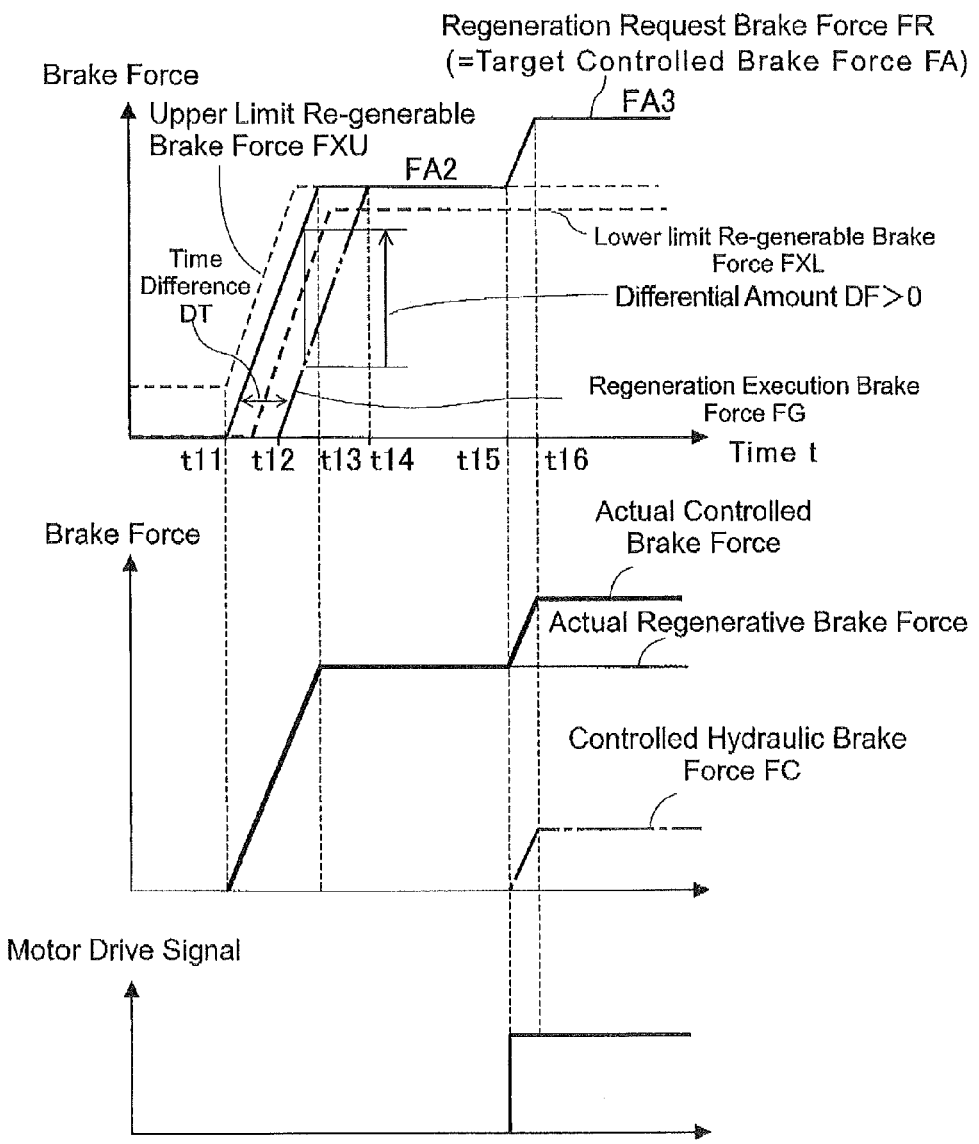
FIG. 6 is a graph schematically showing a result of brake control by the brake ECU according to the first embodiment when the brake pedal is depressed in two steps.
Figure 7:
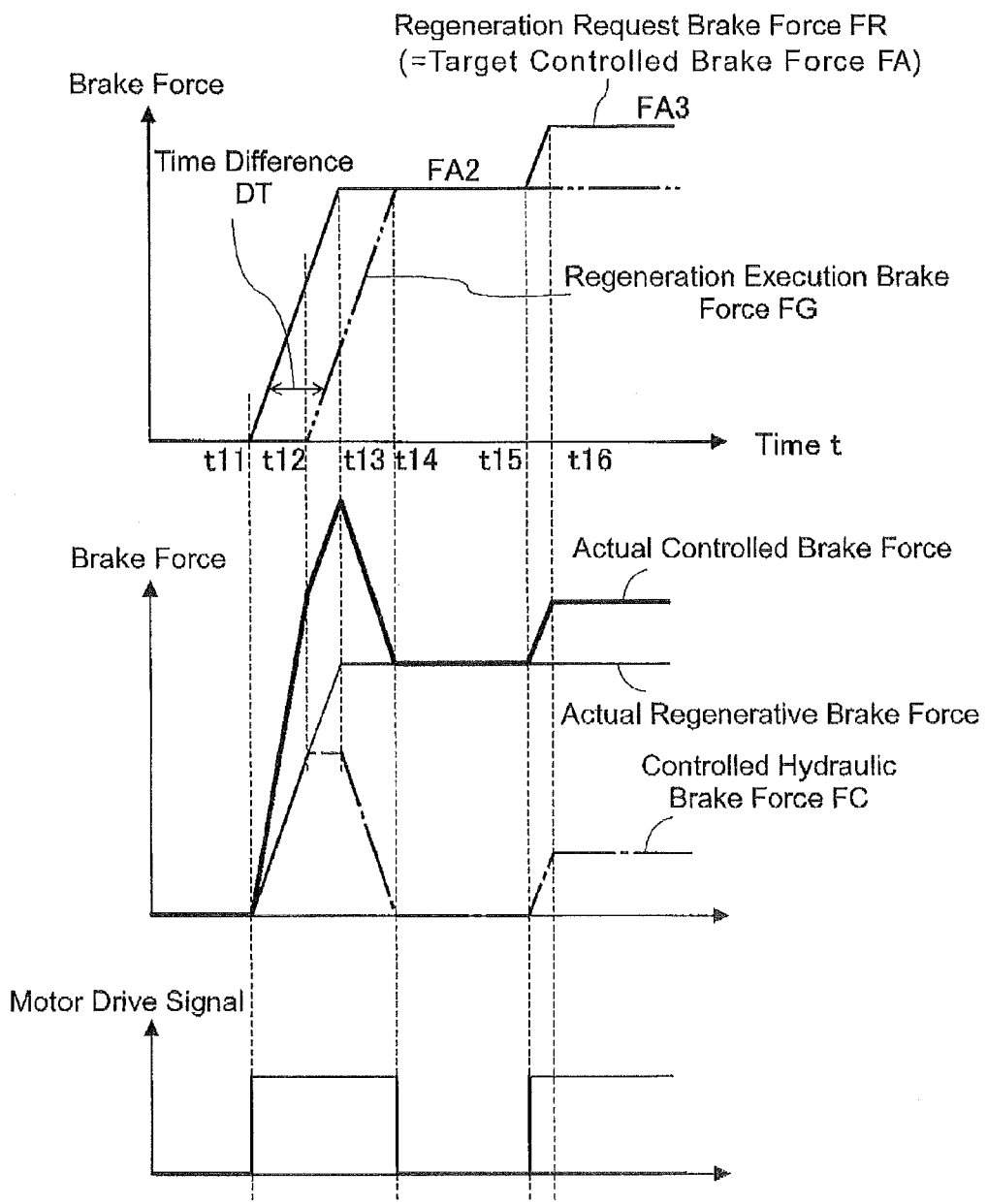
FIG. 7 is a graph schematically showing a result of brake control using a conventional technology when the brake pedal is depressed as the same mode as FIG. 6.

Next, the operation and the effects of the vehicle brake system 1 according to the first embodiment will be explained comparing with those of a conventional structure. FIG. 6 is a graph schematically showing the result of the brake control by the brake ECU 60 of the first embodiment under the brake pedal 21 being depressed in two steps. FIG. 7 is a graph similar to FIG. 6, but showing the result of brake control according to the conventional technology under the brake pedal 21 being depressed in the same way. The graph at top in FIG. 6 shows the regeneration request brake force FR (=target controlled brake force FA), at center in FIG. 6 shows the actual control brake force and at bottom in FIG. 6 shows the motor driving signal. The horizontal axes of all graphs indicate the time (t). The graphs in FIG. 7 also indicate the same to those in FIG. 6, but showing the conventional operation and results.

In the first embodiment shown in FIG. 6, as shown in the top graph, the brake pedal 21 depression (operation) begins from the time "t11" and the target controlled brake force FA and the regeneration request brake force FR begin to be generated. The value FA (or FR) increases as the depression of the pedal increases until the time "t13". The value FA2 of the target controlled brake force FA (equal to the regeneration request brake force FR) becomes constant from the time "t13" to "t15". Then the value of the target controlled brake force FA increases from the time "t15" to time "t16" and thereafter the value FA3 of the target controlled brake force keeps constant from the time "t16" again. The constant value FA2 between the time "t13" and "t15" approximately agrees to the value of regenerative brake capacity CA. The regeneration execution brake force FG shown with a dashed double-dotted line rises at the time "t12" with a time delay (time difference DT) caused by a communication delay. At time "t14", the regeneration execution brake force FG agrees to the regeneration request brake force FR. The differential amount DF obtained by subtracting the value of the regeneration execution brake force FG from the value of the regeneration request brake force FR becomes the positive value from the time "t11" to the time "t14". And the value of the regeneration request brake force FR is positioned between the upper limit re-generable brake force FXU and the lower limit re-generable brake force FXL from the time "t11" to the time "t15". Accordingly, the conditions in steps S10 and S11 in FIG. 4 are satisfied and therefore the execution at step S12 is made to stop the driving of the pumps 37 and 47. Further, the differential amount DF and the controlled hydraulic brake force FC become zero between the time "t14" and "t15". Therefore, the step S12 is executed to stop the driving of the pumps 37 and 47. This stopping of the pumps 37 and 47 restricts the increase of the controlled hydraulic brake force.

When the time "t15" passes, since the regeneration request brake force FR exceeds the value of the upper limit re-generable brake force FXU, the controlled hydraulic brake force FC becomes necessary. Then the brake ECU 60 sends motor driving signal shown in bottom graph of FIG. 6 to thereby drive the pumps 37 and 47. As the result, as shown in the center graph of FIG. 6, only the regenerative brake force is generated during the time between "t11" and "t15" and both the regenerative brake force and the controlled hydraulic brake force FC are generated from the time "t15" and thereafter. The actual controlled brake force which is the total of both brake forces above shows the wave corresponding to the target controlled brake force FA shown in the top graph of FIG. 6.

According to the conventional technology shown in FIG. 7, the signal representing the regeneration execution brake force FG received by the brake ECU 60 and indicated with a dashed double-dotted line does not immediately increase due to the time difference DT caused by the communication delay even when the command of the regeneration request brake force FR equal to the target controlled brake force FA is sent to the generator-motor at the time "t11". Accordingly, since the regeneration execution brake force FG seems to be insufficient, the motor drive signal is sent to drive the pumps 37 and 47 at the time of "t11" as shown in the bottom graph of FIG. 7. This driving of pumps 37 and 47 continues until the time difference DT is dissolved at the time "t14". Accordingly, as shown in the center graph of FIG. 7, the controlled hydraulic brake force FC is generated to overlap with the regenerative brake force from the time "t11" to the time "t14". This means that an excess control brake force is actually applied which leads to a deterioration of brake operation feeling felt by the operator of the vehicle. Further, the amount of the regenerative brake force is reduced due to the overlapping of the controlled hydraulic brake force FC and the regeneration efficiency may drop.

According to this embodiment, even if an actually generating regenerative brake force would not be known on a real time basis, an excess increase of controlled hydraulic brake force FC can be prevented and good brake feelings by the operator and high regeneration efficiency can be achieved. Further, since the re-generable brake force range at the next point is estimated based on a regeneration request brake force FR, regenerative brake capacity CA and the re-generable slopes SL (SLU, SLL) at a certain time point, the range of the re-generable brake force FX (FXU, FXL) can be highly accurately estimated. Therefore, the control of distribution of the total target brake force FT to the basic hydraulic pressure brake force FB, the controlled hydraulic brake force FC and the regeneration execution brake force FG can be highly accurately achieved.

Next, the first application example which improves the reliability of the brake control according to the first embodiment will be explained hereinafter. In this first application example, the value of the regeneration request brake force FR is judged in advance, in order to avoid possible departing thereof from the area between the upper limit re-generable brake force FXU and the lower limit re-generable brake force FXL, which may lead to non-following of the regenerative brake force to be generated by the generator-motor. Thus the controlled hydraulic brake force FC is increased if there is a possibility of non-following of the regeneration execution brake force by the generator-motor. In other words, the brake ECU 60 drives the pumps 37 and 47 if one of the following conditions is satisfied: under the condition that the re-generable slope SL (SLU, SLL) is smaller than a first predetermined slope, a regenerative capacity RH, which is determined by subtracting the regeneration request brake force FR from the regenerative brake capacity CA, is smaller than a predetermined capacity, or the regeneration request slope which indicates the time rate of change of the regeneration request brake force FR is larger than a second slope.

Figure 8:
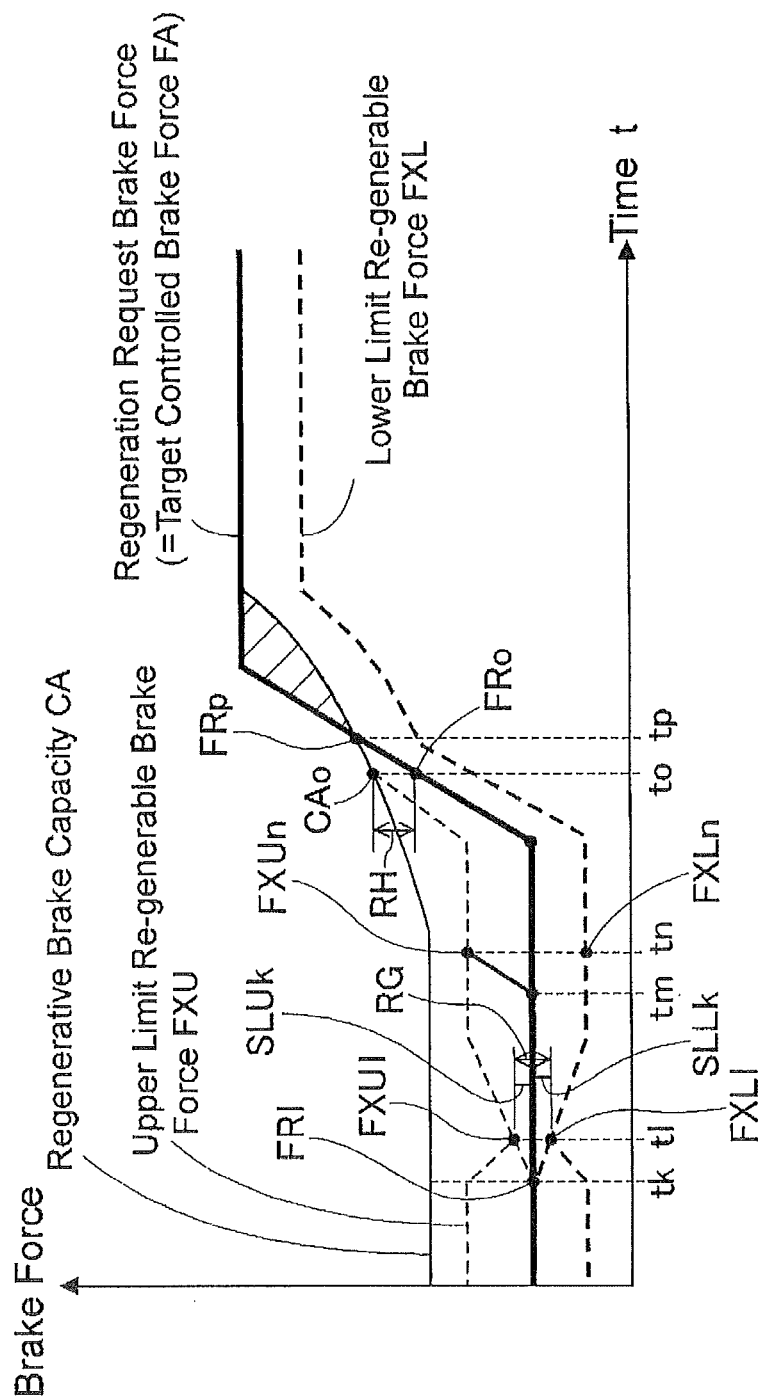
FIG. 8 is a graph schematically showing an operation of a first application example according to the first embodiment of the invention.

FIG. 8 is a graph explaining the operation of the first application example of the first embodiment. As shown in FIG. 8, when the upper limit re-generable slope SLUk and the lower limit re-generable slope SLLk at the time "tk" are smaller than the predetermined first slope, the range RG of re-generable brake force FX becomes narrow at the time "tl". This can be indicated by the following equation:

Range $RG$=upper limit re-generable brake force $FXUl$-lower limit re-generable brake force $FXLl$=upper limit re-generable slope $SLUk$-lower limit re-generable slope $SLLk$.

Accordingly, only a small change of regeneration request brake force FRk at the time "tk" may lead to a deviation of the regeneration request brake force FRl from the range RG of the re-generable brake force FX at the next time V. Further, if the regeneration request slope SLR of the regeneration request brake force FRm at the time of "tm" is greater than the predetermined second slope, the regeneration request brake force FRn at the time of "tn" largely changes as shown in the FIG. 8 and may deviate from the range between the upper and lower re-generable brake forces FXUn and FXLn. Further, the regeneration request brake force FRp at the time of "tp" agrees to the regenerative brake capacity CA, but at the former time "to" the regenerative capacity RH obtained by subtracting the regeneration request brake force FRo from the regenerative brake capacity CAo becomes smaller than the predetermined capacity. Accordingly, at the time "to", it can be predicted that the regeneration request brake force FRp may exceed the regenerative brake capacity CA at the next time "tp".

These three possibilities mean that the regenerative brake force generated by the generator-motor may not follow the regeneration request brake force FR. Accordingly, the brake ECU 60 drives pumps 37 and 47 at any of the times "tk", "tm" and "to" at which any of the three above-mentioned conditions is satisfied. By this driving of the pumps, the controlled hydraulic brake force FC is increased to compensate any possible insufficiency of the regenerative brake force by the generator-motor to assuredly generate the total target brake force FT, which leads to the improvement in brake control reliability. The predetermined first and the second slopes and the predetermined capacity may be determined considering the performance of the regenerative brake device A. Further, it may be possible to use one or two of these three above-mentioned conditions, instead of using all of three.

Next, the second application example of the first embodiment with back-up function will be explained. In the second application example, the brake ECU 60 includes a back-up means, in which even after a predetermined time delay elapsed after the command of the regeneration request brake force FR had been sent to the generator-motor, if the signal representing the regeneration execution brake force RG has not been received by the brake ECU 60, the controlled hydraulic brake force FC is increased as a back-up function. The predetermined time delay can be determined, for example, to be equal to the time difference DT caused by the communication delay as shown in FIGS. 6 and 7.

Figure 9:
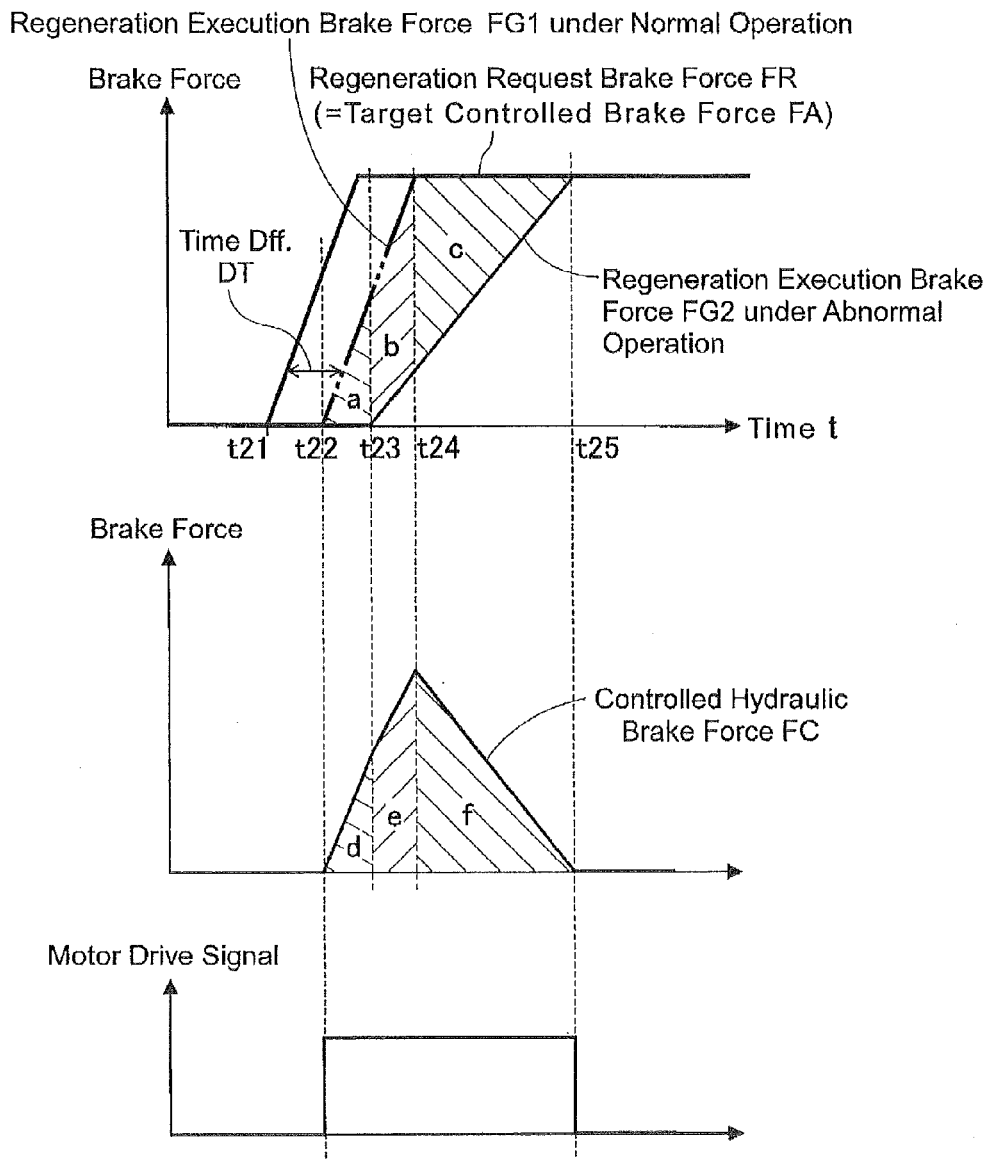
FIG. 9 is a graph similar to FIG. 8, but showing an operation of a second application example according to the first embodiment of the invention.

FIG. 9 is a graph showing the operation of the second application example. In FIG. 9, the top graph indicates the regeneration request brake force FR which has been sent and the regeneration execution brake force FG which has been received and the center graph shows the controlled hydraulic brake force FC and the bottom graph shows the motor drive signal. The horizontal axes of these three graphs indicate the common time axes "t". As shown in the top graph in FIG. 9, when the regeneration request brake force FR is generated upon the depression of the brake pedal 21 at the time of "t21", the regeneration execution brake force FG1 shown with a dashed double-dotted line under normal operation is generated from the time "t22" delayed with the time difference DT and at the time "t24" agrees with the value of regeneration request brake FR which is already constant.

Supposing that something goes wrong with the regenerative brake device A and the regeneration execution brake force FG2 begins increasing gradually and slowly from the time "t23", in which start of increase was delayed compared to the normal operation and that the regeneration execution brake force FG2 agrees with the value of regeneration request brake FR (target controlled brake force FA) at the time "t25", the brake ECU detects the defect or failure from the fact that it does not receive the normal regeneration execution brake force FG1 a little after the time of "t22" and sends the motor driving signal as shown in the bottom graph in FIG. 9 to drive the pumps 37 and 47 thereby to increase the control hydraulic pressure brake force FC. Further, the hydraulic control valves 31 and 41 are controlled to compensate for the insufficient regenerative brake force determined by subtracting the regeneration execution brake force FG2 under abnormal operation from the regeneration execution brake force FG1 under normal operation) in three separate times, the time between the time "t22" and "t23", the time between the time "t23" and "t24" and the time between the time "t24" and "t25".

Thus the controlled hydraulic brake force FC as shown in the center graph of FIG. 9 is generated. The shaded areas "d", "e" and "f" respectively become equal in area to the shaded areas "a", "b" and "c" shown in the top graph. Accordingly, the non-generated regenerative brake force can be compensated for by the controlled hydraulic brake force FC to achieve the back-up function.

Figure 10:
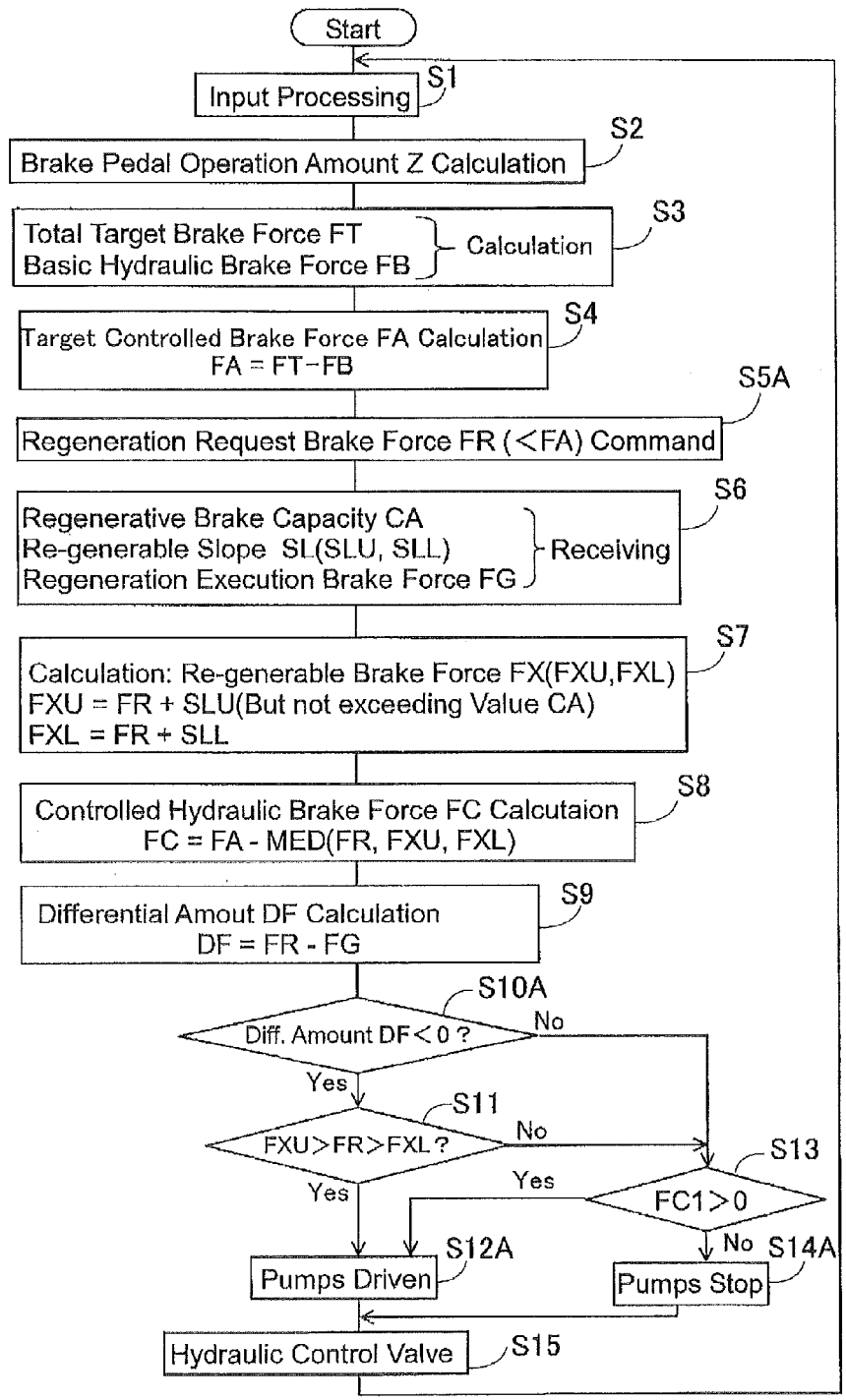
FIG. 10 is a control flowchart for brake ECU according to a second embodiment of the invention.

Next, the vehicle brake system according to the second embodiment of the invention will be explained. The structure of the vehicle brake system according to the second embodiment has the same structure of the vehicle brake system 1 according to the first embodiment as shown in FIGS. 1 and 2 and the brake control for decreasing the ratio of the regenerative brake force relative to the total target controlled brake force is the subject of this embodiment. This mode of brake control is carried out under the case wherein the brake force is being shifted to the operation of the hydraulic brake device B, while the brake operation by the regenerative brake device A being stopped, under the vehicle running speed being decreased. FIG. 10 shows the flow chart of the brake ECU 60 according to the second embodiment. According to the second embodiment, the step S5 in FIG. 4 is replaced with the step S5A in FIG. 10 and the steps S10A through S14A in FIG. 10 are different control from the steps S10 through S14 in FIG. 4.

In FIG. 10, at the step S5A the brake ECU 60 sends the command of the regeneration request brake force FR smaller than the target controlled brake force FA to request the same from the generator-motor via the hybrid ECU 50. The condition necessary to be satisfied for sending the command of the regeneration request brake force FR smaller than the target controlled brake force FA is predetermined in advance in the brake ECU 60 and the process of step 5A and the processes thereafter will be executed only when the condition is satisfied. Also the extent of making the regeneration request brake force FR small is predetermined in advance.

In the step S10A in FIG. 10, it is judged whether the differential amount DF calculated at the step S9 is positive or negative and if judged to be negative, the control process goes to step S11. At the step S11, it is judged whether the regeneration request brake force FR is within the range of re-generable brake force or not, in other words, whether the regeneration request brake force FR is positioned between the upper limit re-generable brake force FXU and the lower limit re-generable brake force FXL. If the value is within the range, the control process goes to step S12A. At the step S12A, the pumps 37 and 47 in the hydraulic control unit 25 is driven to increase the controlled hydraulic brake force FC, regardless of the calculation result of the controlled hydraulic brake force FC at step S8. The execution of the step S12A corresponds to the hydraulic pressure increase means.

If the condition of the step S10A or the step S11 is not satisfied, the control process goes to step S13 and at this step, if the value of the controlled hydraulic brake force FC1 calculated at the step S8 is judged to be positive, the process goes to step S12A and if not positive, goes to step S14. At the step S14, the pumps 37 and 47 in the hydraulic control unit 25 are stopped to restrict the increase of controlled hydraulic brake force FC. The steps S12A and S14A merge at the step S15 to control the hydraulic control valves 31 and 41 in the hydraulic control unit 25. Thus, the increase of the controlled hydraulic brake force FC and restriction of the increase of the controlled hydraulic brake force FC are carried out. The control flow ends here and returns to the step S1 to repeat the control.

Next, the operation and the effects of the vehicle brake system according to the second embodiment of the invention will be explained comparing with those of the conventional art. FIG. 11 is a graph schematically showing the result of the brake control by the brake ECU 60 of the second embodiment, wherein the ratio of the regenerative brake force relative to the target controlled brake force is decreased under the brake depression amount of the brake pedal 21 being kept constant. FIG. 12 is a graph similar to FIG. 11, but showing the result of brake control according to a conventional technology under the brake pedal 21 being depressed in the same way. The graph at top in FIGS. 11 and 12 shows the target controlled brake force FA and the regeneration request brake force FR, at center in FIGS. 11 and 12 shows the actual control brake force and at bottom in FIGS. 11 and 12 shows the motor driving signal. The horizontal axes of all graphs indicates the time (t).

In the second embodiment shown in FIG. 11, as shown in the top graph the target controlled brake force FA is approximately kept constant under a condition wherein the brake pedal 21 depression (operation) amount is kept constant. The brake ECU 60 begins to reduce the regeneration request brake force FR at the time "t21" referring to, for example, the decrease of the vehicle running speed and makes the force FR zero at the time of "t23". The regeneration execution brake force FG begins to decrease at the time "t22" due to the time difference (DT) caused by the communication delay and becomes zero at the time "t24". The differential amount DF obtained by subtracting the value of the regeneration execution brake force FG from the regeneration request brake force FR becomes the negative value from the time "t21" to the time 123". And the value of the regeneration request brake force FR is positioned between the upper limit re-generable brake force FXU and the lower limit re-generable brake force FXL from the time "t21" to the time "t23". Accordingly, the conditions in steps S10A and S11 in FIG. 10 are satisfied and therefore the brake ECU 60 executes the step S12A to drive the pumps 37 and 47 by sending the motor driving signal as shown in the graph at the bottom of FIG. 11 at the time "t21".

After the time "t23", the condition of step S11 becomes no more satisfied. However, a large amount of controlled hydraulic brake force FC1 is calculated to still continue to drive the pumps 37 and 47. As shown in the graph in the center of FIG. 11, by the driving of the pumps 37 and 47, actually decreased amount of regenerative brake force can be compensated for by increasing the hydraulic pressure brake force FC from the time "t21" to the time "t23". Thus, the wave shape of the actual controlled brake force which is the sum of the actual regenerative brake force and the controlled hydraulic brake force FC agrees to the wave shape of the target controlled brake force FA.

Comparing to this second embodiment of the present invention, in the conventional art shown in FIG. 12, even the regeneration request brake force FR begins to be decreased at the time "t21", the regeneration execution brake force FG does not immediately decrease due to the time difference DT caused by the communication delay. Accordingly, the regeneration execution brake force FG seems to be large and at the time "t21" the pumps 37 and 47 stop the operation thereof and after detecting the decrease of regeneration execution brake force FG, the motor driving signal is sent to drive the pumps 37 and 47 as shown at the bottom graph in FIG. 12. Accordingly, the actual controlled brake force becomes insufficient as seen in V-shape in the center graph in FIG. 12.

According to the second embodiment, even if an actually generating regenerative brake force would not be known on a real time basis, an insufficient regenerative brake force can be compensated for by increasing the controlled hydraulic brake force FC and brake feelings by the operator can be improved.

It should be noted here that it is possible to use both the first and second embodiments by combining any part thereof. The first and the second application examples of the first embodiment can be also used at the same time. Further it is noted that both the first and second embodiments have the hydraulic brake device B including the master cylinder 23 which generates the basic hydraulic pressure and the pumps 37 and 47 which generate control hydraulic pressure. However, the invention is not limited to this structure. The invention may be applied to a structure, wherein for example, the pumps only can generate the hydraulic pressure without using the master cylinder, which is so called a hydraulic brake device of brake-by-wire type.

According to the first embodiment of the invention, the vehicle brake system 1 includes a hydraulic brake device (B) for supplying hydraulic brake force (FB, FC) to the vehicle wheels (7FR, 7FL, 7RR and 7RL), a regenerative brake device (A) for applying regenerative brake force to drive wheels (7FR and 7FL) among the wheels (7FR, 7FL, 7RR and 7RL) of the vehicle driven by a generator-motor (not shown) and a brake control device (brake ECU 60 and hybrid ECU 50) for cooperatively controlling the hydraulic brake force (FB, FC) of the hydraulic brake device (B) and the regenerative brake force of the regenerative brake device (A) in response to an operation amount of a brake operation member (brake pedal 21). The brake control device includes a differential amount calculating means (step S9) for calculating a differential amount (DF) by subtracting a regeneration execution brake force (FG) obtained by execution of the generator-motor from a regeneration request brake force (FR) obtained by command to the generator-motor, a regenerative range judging means (step S11) for judging whether or not the regeneration request brake force (FR) is within a range of a re-generable brake force (FX) which is executable by the generator-motor and a hydraulic pressure restricting means (step S12) for restricting increase of the controlled hydraulic brake force when the differential amount (DF) is judged to be a positive value and the regeneration request brake force (FR) is judged to be within the range of the re-generable brake force.

Accordingly, in the vehicle brake system according to this embodiment, the brake control device (brake ECU 60 and hybrid ECU 50) which cooperatively controls the hydraulic brake force and the regenerative brake force in response to the operation amount of the brake pedal 12, restricts the increase of hydraulic brake force when the differential amount DF defined by subtracting the regeneration execution brake force from the regeneration request brake force obtained by command to the generator-motor is a positive value and the regeneration request brake force is within the range of executable re-generable brake force by the generator-motor. The case where the differential amount DF is positive value happens normally at the time when the regeneration execution brake force superficially seems to be insufficient due to the time delay upon the regeneration request brake force being increased. Even when the brake control device does not recognize the current regeneration execution brake force, if the regeneration request brake force is within the executable range of the generator-motor, it can be judged that the generator-motor is increasing the regenerative brake force as instructed and the brake control device restricts the increase of the hydraulic brake force. Thus, even without knowing the actually generated regenerative brake force, an increase of excessively generating hydraulic brake force can be prevented to give a good brake operation feeling to the operator of the vehicle and at the same time high regeneration efficiency can be achieved.

According to the second the embodiment of the invention, the vehicle brake system 1 comprises a hydraulic brake device (B) for applying hydraulic brake force (FB, FC) to wheels (7FR, 7FL, 7RR and 7RL) of a vehicle, a regenerative brake device (A) for applying regenerative brake force to drive wheels (7FR and 7FL) among the wheels of the vehicle driven by a generator-motor and a brake control device (brake ECU 60 and hybrid ECU 50) for cooperatively controlling the hydraulic brake force of the hydraulic brake device (B) and the regenerative brake force of the regenerative brake device (A) in response to an operation amount of a brake operation member (brake pedal 21), wherein the brake control device, upon decreasing a ratio of the regenerative brake force relative to a total target brake force amount (FT) determined by the operation amount of the brake operation member, includes a differential amount calculating means (step S9) for calculating a differential amount (DF) by subtracting a regeneration execution brake force obtained by execution of the generator-motor from a regeneration request brake force obtained by command to the generator-motor, a regenerative range judging means (step S11) for judging whether or not the regeneration request brake force is within a range of a re-generable brake force which is executable by the generator-motor and a hydraulic pressure increasing means (step S12A) for increasing the hydraulic brake force when the differential amount is a negative value and the regeneration request brake force is within the range of the re-generable brake force.

Accordingly, in the vehicle brake system according to this embodiment, the brake control device (brake ECU 60 and hybrid ECU 50) increases hydraulic brake force when the differential amount DF defined by subtracting the regeneration execution brake force from the regeneration request brake force obtained by command to the generator-motor is a negative value and the regeneration request brake force is within the range of executable re-generable brake force by the generator-motor, so that the ratio of regenerative brake force relative to the total target brake force amount (FT) is to be decreased. The case where the differential amount DF is a negative value happens normally at the time when the regeneration execution brake force superficially seems to be excessive due to the time delay upon the regeneration request brake force being decreased. Even when the brake control device recognizes the regeneration execution brake force which is beyond the instructed amount, if the regeneration request brake force is within the executable range of the generator-motor, it can be judged that the generator-motor is decreasing the regenerative brake force as instructed and the brake control device increases the hydraulic brake force. Thus, even without knowing the current generated regenerative brake force, an insufficient brake force due to the decrease of the regenerative brake can be compensated for by increasing the hydraulic brake force thereby to give a good brake operation feeling to the operator of the vehicle.

According to one aspect of the embodiment of the invention, the vehicle brake system 1 comprises the brake control device comprised of a hydraulic brake control portion (brake ECU 60) for controlling the hydraulic brake device (B), a regenerative brake control portion (hybrid ECU 50) for controlling the regenerative brake device (A) and a telecommunication means through which the hydraulic brake control portion and the regenerative brake control portion are operatively connected with each other, wherein a time difference (DT) is generated at the hydraulic brake control portion between the command of the regeneration request brake force and the signal representing the regeneration execution brake force caused by a telecommunication delay.

Accordingly, in thus structured vehicle brake system 1 according to the embodiment, the effects of giving a good brake operation feeling to the operator of the vehicle and at the same time high regeneration efficiency can be achieved without the hydraulic brake control portion knowing the current generated regenerative brake force on a real time basis due to the telecommunication delay.

According to another aspect of the embodiment of the present invention, the hydraulic brake device (B) includes a master cylinder 23 for generating a basic hydraulic pressure in response to the operation amount of the brake operation member (brake pedal 21), pumps 37 and 47 for generating a controlled hydraulic pressure, and a hydraulic control unit 25 for applying a basic hydraulic brake force (FB) corresponding to the basic hydraulic pressure and adding thereto a controlled hydraulic brake force (FC) corresponding to the controlled hydraulic pressure to the wheels (7FR, 7FL, 7RR and 7RL) of the vehicle, wherein the brake control device includes a pump restriction means (step S12) for restricting the pump driving when the sum of the basic hydraulic brake force and the re-generable brake force exceeds the total target brake force determined by the operation amount of the brake operation member (brake pedal 21).

Accordingly, when the sum of the basic hydraulic brake force and the re-generable brake force exceeds the total target brake force determined by the operation amount of the brake operation member (brake pedal 21), it can be judged to be able to obtain sufficient brake force, regardless of the level of regeneration execution brake force, so that the pump driving operation can be restricted. Accordingly, as same as the effects stated in the preceding aspect of the embodiment, a good brake operation feeling to the operator of the vehicle and at the same time high regeneration efficiency can be achieved by preventing excess generation of the controlled hydraulic brake force, without knowing the current generated regenerative brake force on a real time basis due to the telecommunication delay.

According to still another aspect of the embodiment of the present invention, the brake control device (brake ECU 60 and hybrid ECU 50) includes a regenerative brake capacity specifying means for specifying a regenerative brake capacity (CA) indicating the total amount of a re-generable brake force by the generator-motor at a certain point of time, a re-generable slope specifying means for specifying a re-generable slope (SL, SLU, and SLL) indicating a time rate of change of the re-generable brake force (FX) of the generator-motor at a certain point of time and a re-generable range estimating means (step S7) for estimating a range of the re-generable brake force (FX, FXU and FXL) at the next point of time based on the regeneration request brake force or the regeneration execution brake force, regenerative brake capacity and a re-generable slope at a certain point of time.

Accordingly, in this embodiment, by executing the estimation successively, the range of the re-generable brake force (FX, FXU and FXL) can be highly accurately obtained and the accurate distribution of the total target brake force into the basic hydraulic brake force, the controlled brake force and the regenerative brake force can be performed so as to obtain a good brake operation feeling and high efficiency of regeneration.

According to further aspect of the embodiment of the invention, the brake control device includes a pump driving means (steps S12A) for driving the pump 37 and 47 when a predetermined condition is established. According to still further aspect of the embodiment of the invention, the predetermined condition is that the re-generable slope SL is smaller than a predetermined first slope.

The small re-generable slope means the possibility that the actual regenerative brake force cannot follow the change of regeneration request brake force. Accordingly, the pumps are driven to generate the controlled brake force thereby to surely generate the total target brake force. This can lead to the improvement in reliability.

According to still further aspect of the embodiment of the invention, the predetermined condition to be satisfied to drive the pumps is that a regenerative capacity RH which is obtained by subtracting the regeneration request brake force FR from the regenerative brake capacity CA is smaller than a predetermined capacity.

In this aspect of the embodiment, the regenerative capacity RH is smaller than a predetermined capacity, which means the possibility that when the regeneration request brake force is increased, the actual regenerative brake force of the generator-motor may not follow the increase. Accordingly, the pumps are driven to surely generate the total target brake force. This can lead to the improvement in reliability.

Further, according to the embodiment of the invention, the predetermined condition to be satisfied to drive the pumps is that the regeneration request slope indicating the time rate of change of the regeneration request brake force FR is larger than a predetermined second slope.

In this aspect of the embodiment, that the regeneration request slope is larger than a predetermined second slope means the possibility that the regeneration request brake force FR may change greatly and the actual regenerative brake force of the generator-motor cannot follow the great change. Accordingly, the pumps are driven to generate the controlled hydraulic brake force FC so as to surely generate the total target brake force FT. This can lead to the improvement in reliability.

According to an aspect of the embodiment of the present invention, the brake control device (brake ECU 60 and hybrid ECU 50) includes a back-up means for increasing the hydraulic brake force when the regeneration execution brake force (FG) is not generated after a predetermined delay time (DT) elapsed after the command of the regeneration request brake force (FR) is sent to the generator-motor.

Normally the generator-motor generates the regenerative brake force within the range of the re-generable brake force. However, there are possible problems due to some reason, which the regeneration execution brake force may become insufficient or may delay. In such case, the regeneration execution brake force is not generated even though the delay time caused by the telecommunication delay or the like, has passed. The brake control device detects such failures and increases the hydraulic brake force. Thus, even under the failure of regenerative brake device (A), the insufficient regenerative brake force can be compensated for by the hydraulic brake force to realize the back-up function.

Obviously, numerous modifications and variations of the present invention are possible in light of the above teachings. It is therefore to be understood that within the scope of the appended claims, the present invention may be practiced otherwise than as specifically described herein.

What is claimed is:

1. A vehicle brake system comprising:
   a hydraulic brake device for applying hydraulic brake force to wheels of a vehicle;
   a regenerative brake device for applying regenerative brake force to drive wheels among the wheels of the vehicle driven by a generator-motor; and
   a brake control device for cooperatively controlling the hydraulic brake force of the hydraulic brake device and the regenerative brake force of the regenerative brake device in response to an operation amount of a brake operation member, wherein the brake control device includes;
   a differential amount calculating means for calculating a differential amount by subtracting a regeneration execution brake force obtained by execution of the generator-motor from a regeneration request brake force which is commanded to the generator-motor;
   a regenerative range judging means for judging whether or not the regeneration request brake force is within a range of a re-generable brake force which is executable by the generator-motor; and
   a hydraulic pressure restricting means for restricting increase of the hydraulic brake force when the differential amount is judged to be a positive value and the regeneration request brake force is judged to be within the range of the re-generable brake force.

2. The vehicle brake system according to claim 1, wherein the brake control device is comprised of a hydraulic brake control portion for controlling the hydraulic brake device, a regenerative brake control portion for controlling the regenerative brake device and a telecommunication means through which the hydraulic brake control portion and the regenerative brake control portion are operatively connected with each other, wherein a time difference is generated at the hydraulic brake control portion between a request signal representing the regeneration request brake force and a signal of execution thereof representing the regeneration execution brake force caused by a telecommunication delay.

3. The vehicle brake system according to claim 1, wherein the hydraulic brake device includes a master cylinder for generating a basic hydraulic pressure in response to the operation amount of the brake operation member, a pump for generating a controlled hydraulic pressure, and a hydraulic control unit for applying a basic hydraulic brake force corresponding to the basic hydraulic pressure and adding thereto a controlled hydraulic brake force corresponding to the controlled hydraulic pressure to the wheels of the vehicle, wherein the brake control device includes a pump restriction means for restricting the pump driving when the target controlled brake force obtained by subtracting the basic hydraulic brake force from the total target brake force determined by the operation amount of the brake operation member is judged to be within the range of the re-generable brake force.

4. The vehicle brake system according to claim 3, wherein the brake control device includes;
   a regenerative brake capacity specifying means for specifying a regenerative brake capacity indicating the total amount of a re-generable brake force by the generator-motor at a certain point of time;
   a re-generable slope specifying means for specifying a re-generable slope indicating a time rate of change of the re-generable brake force of the generator-motor at a certain point of time; and
   a re-generable range estimating means for estimating a range of the re-generable brake force at the next point of time based on the regeneration request brake force or regeneration execution brake force, regenerative brake capacity and a re-generable slope at a certain point of time.

5. The vehicle brake system according to claim 4, wherein the brake control device further includes a pump driving means for driving the pump when a predetermined condition is established.

6. The vehicle brake system according to claim 5, wherein the predetermined condition is that the re-generable slope is smaller than a predetermined first slope.

7. The vehicle brake system according to claim 5, wherein the predetermined condition is that a regenerative capacity which is obtained by subtracting the regeneration request brake force from the regenerative brake capacity is smaller than a predetermined capacity.

8. The vehicle brake system according to claim 5, wherein the predetermined condition is that the regeneration request slope indicating the time rate of change of the regeneration request brake force is larger than a predetermined second slope.

9. The vehicle brake system according to claim 1, wherein the brake control device includes a back-up means for increasing the hydraulic brake force when the regeneration execution brake force is not generated after a predetermined delay time elapsed after the regeneration request brake force is requested from the generator-motor.

* * * * *